(12) United States Patent
Ohkawa et al.

(10) Patent No.: US 7,162,544 B2
(45) Date of Patent: Jan. 9, 2007

(54) MESSAGE TRANSFER METHOD AND APPARATUS

(75) Inventors: Naokatsu Ohkawa, Kanazawa (JP); Takashi Honda, Kawaski (JP)

(73) Assignee: Fujitsu Limited, Kawasaki (JP)

( * ) Notice: Subject to any disclaimer, the term of this patent is extended or adjusted under 35 U.S.C. 154(b) by 790 days.

(21) Appl. No.: 09/810,241

(22) Filed: Mar. 16, 2001

(65) Prior Publication Data
US 2002/0087733 A1 Jul. 4, 2002

(30) Foreign Application Priority Data
Nov. 2, 2000 (JP) ............... 2000-336323

(51) Int. Cl.
 *G06F 15/16* (2006.01)
 *H04J 3/02* (2006.01)
(52) U.S. Cl. ........................ 709/251; 370/216
(58) Field of Classification Search ........ 709/238–239, 709/246, 251; 370/216–228, 258, 386, 403, 370/907; 714/43
See application file for complete search history.

(56) References Cited

U.S. PATENT DOCUMENTS

| | | | |
|---|---|---|---|
| 5,550,805 A * | 8/1996 | Takatori et al. | 370/222 |
| 6,349,092 B1 * | 2/2002 | Bisson et al. | 370/258 |
| 6,993,684 B1 * | 1/2006 | Ookawa et al. | 714/43 |

FOREIGN PATENT DOCUMENTS

| | | |
|---|---|---|
| EP | 0 996 309 | 4/2000 |
| JP | 2000-134244 | 5/2000 |

\* cited by examiner

*Primary Examiner*—Andrew Caldwell
*Assistant Examiner*—Hieu Le
(74) *Attorney, Agent, or Firm*—Katten Muchin & Rosenman LLP

(57) ABSTRACT

The number of nodes that can be identified is increased without redefining switching request and switching status fields in existing K1/K2 bytes. Eight bits are assigned to a node ID field, and source node ID is stored in the node ID field when transmitting over a short path, while a destination node ID is stored in the node ID field when it transmitting over a long path.

8 Claims, 24 Drawing Sheets

| | K1(1-4) | K1(5-8) | K2(1-4) | K2(5) | K2(6-8) |
|---|---|---|---|---|---|
| a1 | NR | G1 | G1 | 1 | Idle |
| a2 | NR | G0 | G1 | 1 | Idle |
| b1 | NR | G2 | G1 | 0 | Idle |
| b2 | NR | G1 | G1 | 0 | Idle |
| c1 | NR | G2 | G2 | 1 | Idle |
| c2 | NR | G1 | G2 | 1 | Idle |
| d1 | NR | G3 | G2 | 0 | Idle |
| d2 | NR | G2 | G2 | 0 | Idle |
| c3 | SF-R | G1 | G2 | 1 | Idle |
| c4 | SF-R | G1 | G1 | 0 | Idle |
| b3 | RR-R | G2 | G1 | 0 | Idle |
| b4 | SF-R | G2 | G1 | 0 | Idle |
| b5 | RR-R | G2 | G1 | 0 | BrSw |
| b6 | SF-R | G2 | G2 | 0 | BrSw |
| c5 | SF-R | G1 | G2 | 1 | BrSw |
| c6 | SF-R | G1 | G2 | 1 | BrSw |

MESSAGE TRANSFER METHOD AND APPARATUS

BACKGROUND OF THE INVENTION

1. Field of the Invention

The present invention relates to a message transfer method and apparatus in an optical transmission system and, more particularly, to a message transfer method that can increase the maximum number of nodes that can be connected on one ring in a BLSR (Bi-directional Line Switched Ring) network configuration.

2. Description of the Related Art

A BLSR switching control system is implemented conforming to the North American SONET standard GR-1230-CORE. A major feature of the BLSR control system is that line utilization efficiency increases because traffic can be restored in the event of a failure by using a protection line going in the opposite direction along the ring, allowing the protection line for the same channel to be used for another line. The recent trend for the network configuration of optical transmission systems is toward further increases in line capacity and network size backed by technological innovations; with this trend, coupled with the above reason, demand for the BLSR control system is increasing rapidly, and the need for its application to larger ring networks is growing.

In the BLSR control system, switching control is effected by transferring between nodes the K1/K2 bytes contained in the line overhead of the main signal. The K1/K2 byte format defined in GR-1230 is shown in FIG. 1.

When a line failure or the like occurs in a network that uses a BLSR topology such as shown in FIG. 2, the nodes adjacent to each other across the failed span send K1/K2 bytes carrying a switching request, in response to which the adjacent nodes perform a switching operation (and each intermediate node performs a pass-through operation) to restore the traffic from the failure. Furthermore, in order to prevent erroneous connections, etc. from occurring due to switching operations when multiple failures occur on the ring, a unique ID is assigned to each node on the ring, and all the nodes on the ring are made to recognize a ring map defining the ordering of the IDs, to ensure reliable switching operations.

Each node must identify from the received K1/K2 bytes whether the switching request is addressed to itself or not, and must control the switching operation (or pass-through operation) by distinctly recognizing from where and over which path the switching request has arrived (see FIG. 2) by checking against the ring map. For these purposes, "DESTINATION NODE ID", "SOURCE NODE ID", and "PATH", as well as "SWITCHING REQUEST" and "SWITCHING STATUS", are set in the K1/K2 bytes, as shown in FIG. 1.

As an example of the APS (Automatic Protection Switching) protocol using the K bytes, an outline of a ring switching procedure will be described by dealing with the case in which a failure has occurred in the line from #3 to #2 in the network of FIG. 2. Upon detection of the failure, node #2 on the receiving side recognizes from the ring map that the adjacent node is #3, and sends a switching request to the node #3 over a long path (and also over a short path). Since "DESTINATION NODE ID" indicates #3, each intermediate node recognizes that the request is not addressed to itself, and passes the K bytes onto the next node and so on, until the K bytes reach the node #3. The node #3 recognizes that the request is addressed to itself, and knows that a failure has occurred on its outgoing line. The node #3 then returns a response to the switching request to the source node #2. When the switching request response is confirmed between the nodes #2 and #3, the two nodes perform a ring switch.

That is, for BLSR switching control, it is essential that each node on the ring has a unique ID and be able to uniquely identify a "SOURCE NODE" and a "DESTINATION NODE" from the K1/K2 bytes being passed around the ring.

In the previous K1/K2 byte format shown in FIG. 1, "DESTINATION NODE ID" and "SOURCE NODE ID" are each assigned only four bits, with which only 0 to 15 can be defined; therefore, the limitation is that a maximum of 16 nodes can be connected on one ring. GR-1230 defines a method called "ring interconnection" for interconnecting rings to enable the construction of a network ring consisting of more than 16 nodes, but compared with a BLSR constructed with a single ring, this obviously increases the complexity of control as well as the initial equipment cost for the interconnection. Furthermore, the ring interconnection means simply interconnecting a plurality of rings, and the network as a whole does not provide the redundant configuration, unique to the BLSR, that cycles around the ring.

Though it is strongly desired to support a wide area with one ring while making use of the advantage of efficient line utilization of the BLSR topology, the reality is that, with the APS protocol based on the current K/K2 byte format, the limitation of 16 nodes per ring is an unavoidable bottleneck.

Since the K1/K2 bytes are carried for transmission in the K1/K2 byte area defined within the line overhead of the main signal, expanding the K1/K2 byte area itself is extremely difficult as it would require major modifications to the hardware. Furthermore, redefining the "SWITCHING REQUEST" and "SWITCHING STATUS" fields is not easy, because then the APS protocol would have to be redefined.

If more than 16 nodes could be identified by making intelligent use of the "DESTINATION NODE ID", "SOURCE NODE ID", and "PATH" fields in the existing K1/K2 byte format while keeping the "SWITCHING REQUEST" and "SWITCHING STATUS" fields unaltered, a BLSR network with more than 16 nodes on one ring could be constructed without having to expand the K1/K2 byte field and without redefining the BLSR switching control protocol, and all the previous BLSR switching functions could be accomplished while keeping changes from the GR-1230 standard to a minimum.

SUMMARY OF THE INVENTION

It is, accordingly, an object of the present invention to provide a message transfer method and apparatus that enable a larger number of nodes to be identified with the smallest possible amount of data.

According to the present invention, there is provided an apparatus for transferring a message between a plurality of nodes forming a ring, comprising: means for generating a message containing a value specifying a short path and an identifier identifying a source node of the message when the path for the message is a short path; means for generating a message containing a value specifying a long path and an identifier identifying a destination node of the message when the path for the message is a long path; and means for transmitting the generated message.

According to the present invention, there is also provided an apparatus for transferring a message between a plurality of nodes forming a ring, wherein each pair of adjacent nodes forms a group and any two adjacent nodes have node identifiers different from each other, the apparatus comprising: means for generating a message containing a group identifier identifying the group to which a destination node of the message belongs, a group identifier identifying the group to which a source node of the message belongs, and a node identifier identifying the destination node of the message; and means for transmitting the generated message.

According to the present invention, there is also provided an apparatus for transferring a message between a plurality of nodes forming a ring, wherein a first node identifier and a second node identifier are assigned to each node, and each node is uniquely identified by a combination of the first node identifier assigned to the node and two second node identifiers respectively assigned to two nodes adjacent on both sides thereof, the apparatus comprising: means for generating a message containing one of the first and second node identifiers assigned to a destination node of the message, the other one of the first and second node identifiers assigned to a source node of the message, and a value specifying a short path or a long path; and means for transmitting the generated message.

DESCRIPTION OF THE PREFERRED EMBODIMENTS

Figure 1:
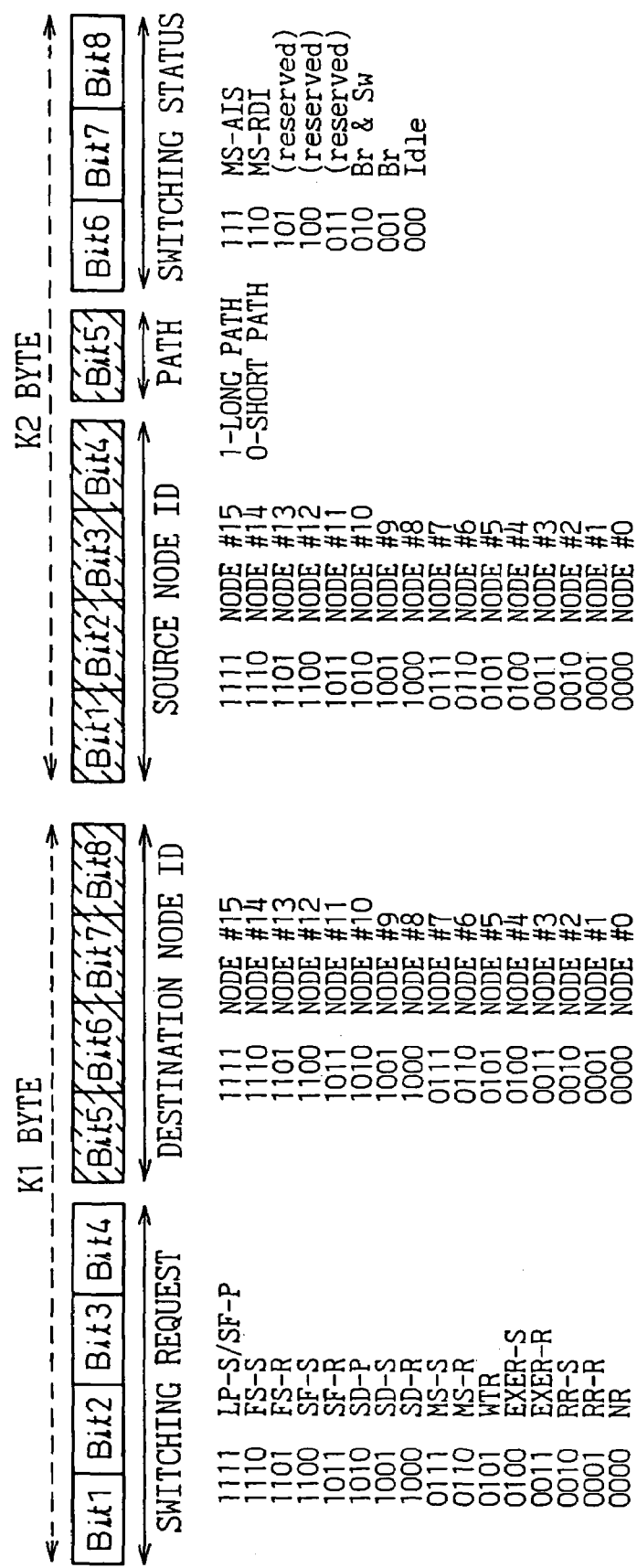
FIG. 1 is a diagram showing the format of K bytes according to a prior art BLSR.
Figure 2:
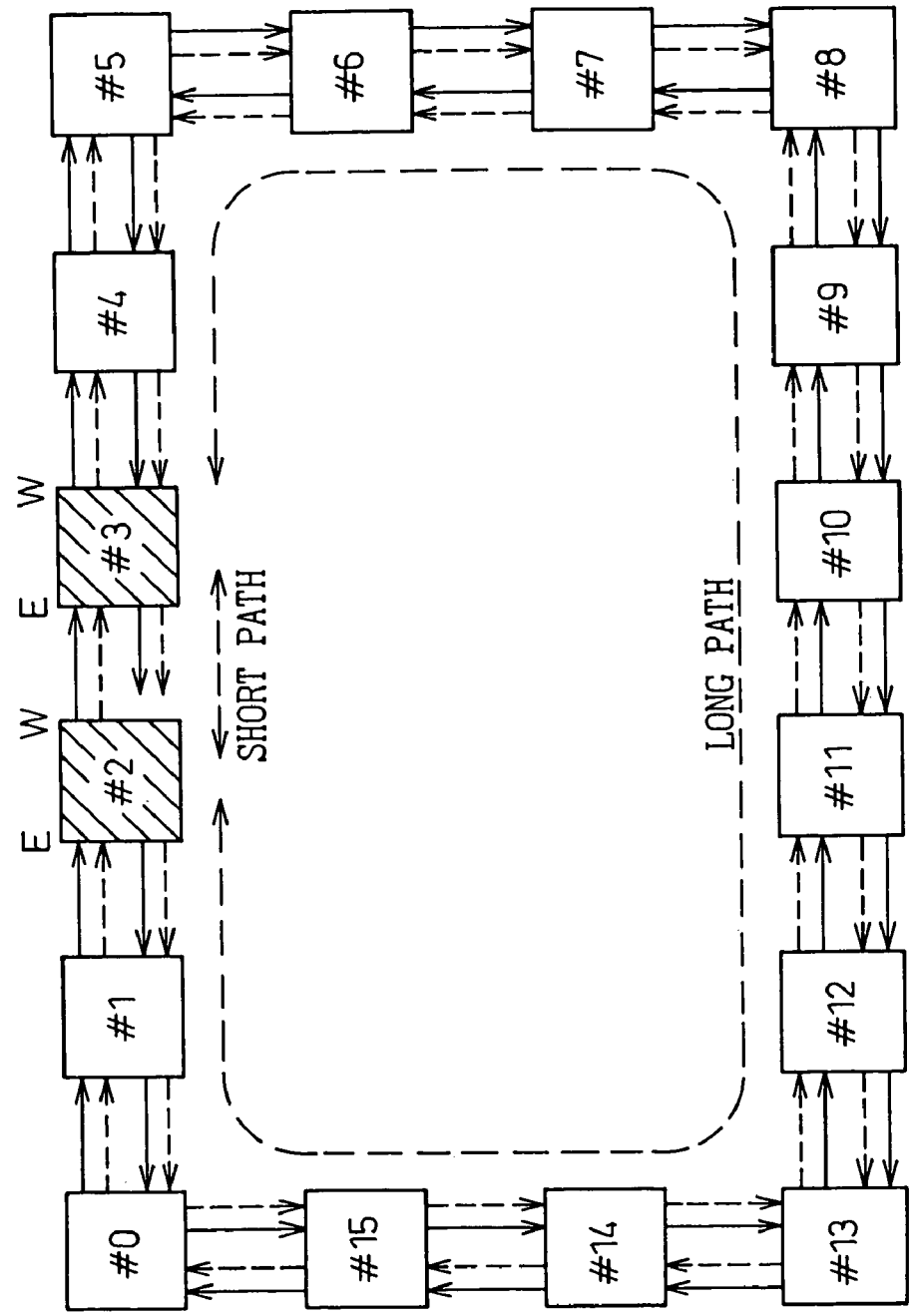
FIG. 2 is a diagram showing one example of a network using a BLSR topology.
Figure 3:
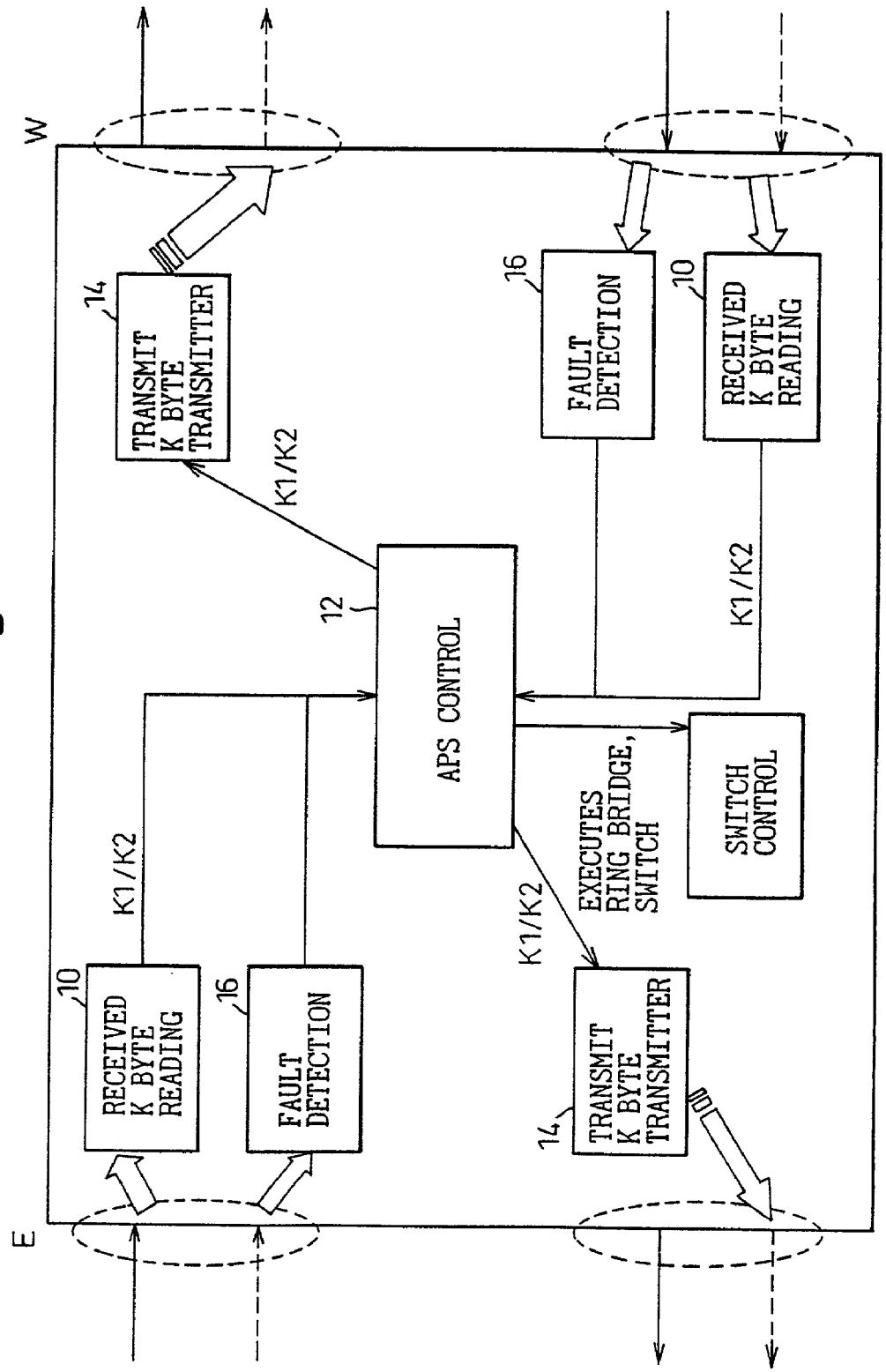
FIG. 3 is a block diagram showing one example of a node configuration.

FIG. 3 shows a node configuration to which the present invention is applied. Only functional blocks associated with the APS protocol are shown in FIG. 3. A received K byte reading unit 10 extracts the K1/K2 bytes from the designated position in the received frame, and passes them to an APS control unit 12. A transmit K byte transmitting unit 14 inserts the K1/K2 bytes, output from the APS control unit 12, into the designated position in the transmit frame. A fault detecting unit 16 detects the presence or absence of a fault in the received frame, and reports the result to the APS control unit 12.

The present invention proposes a technique that enables more than 16 nodes to be identified, by using other fields in the K1/K2 bytes than the "SWITCHING REQUEST" and "SWITCHING STATUS" fields, in the APS protocol in a network constructed, for example, with a BLSR topology. Each embodiment hereinafter described utilizes the premise "The K1/K2 bytes are always destined to an adjacent node (GR-1230 R6-72).

Figure 4:
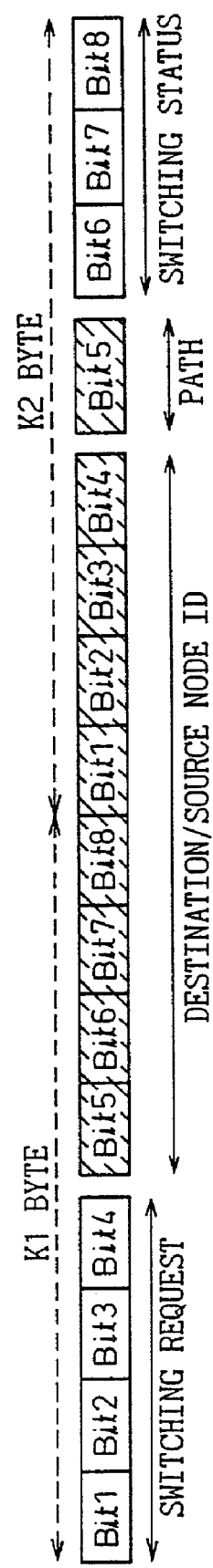
FIG. 4 is a diagram showing the format of K bytes according to a first embodiment of the present invention.

In a first embodiment of the present invention, four bits of bit 5 to bit 8 in K1 and four bits of bit 1 to bit 4 in K2 are combined to define eight bits of "(DESTINATION/SOURCE) NODE ID", as shown in FIG. 4, and this "NODE ID" is used as the destination node ID or the source node ID, depending on the "SHORT/LONG" path information defined by bit 5 in K2. This is done by utilizing the fact that, since the K bytes are always sent to an adjacent node (over a short path or a long path), according to the definition of GR-1230, the node that received the K bytes can identify the other node on the ring from the destination or source node information.

Each node on the ring recognizes the IDs of the adjacent nodes on both sides of it by referring to a ring map such as a topology map, but to implement the above method, the node ID field in the ring map must be expanded from four bits to eight bits.

Figure 5:
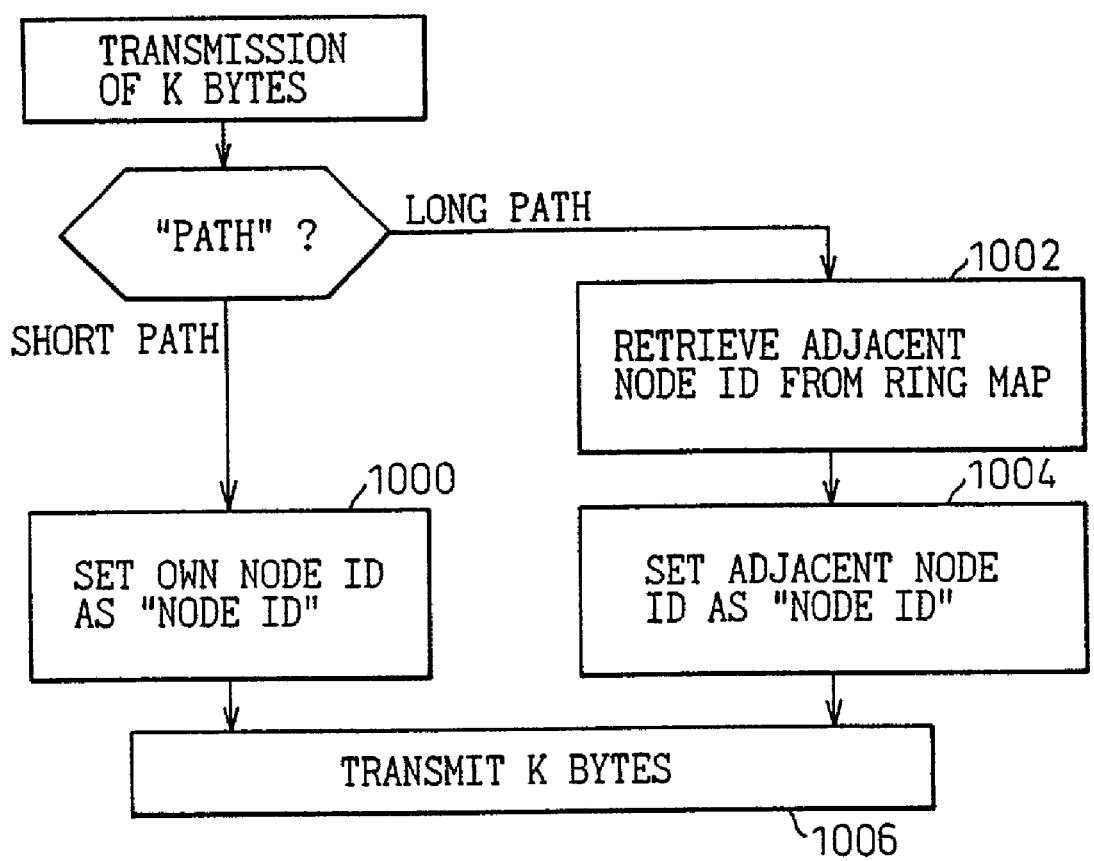
FIG. 5 is a flowchart illustrating the transmission of the K bytes according to the first embodiment of the present invention.

FIG. 5 shows the processing that the APS control unit 12 performs when transmitting the K bytes. At the node transmitting the K bytes, the destination node and the transmission path are determined according to the switching request.

When transmitting the K bytes over the "short path", its own node ID is set as the "NODE ID" (step 1000). When transmitting the K bytes over the "long path", the adjacent destination node ID acquired from the ring map is set as the "NODE ID" (steps 1002 and 1004). As a result, the K bytes are transmitted carrying in the "NODE ID" field the "SOURCE NODE ID" in the case of the "short path" or the "DESTINATION NODE ID" in the case of the "long path" (step 1006).

Figure 6:
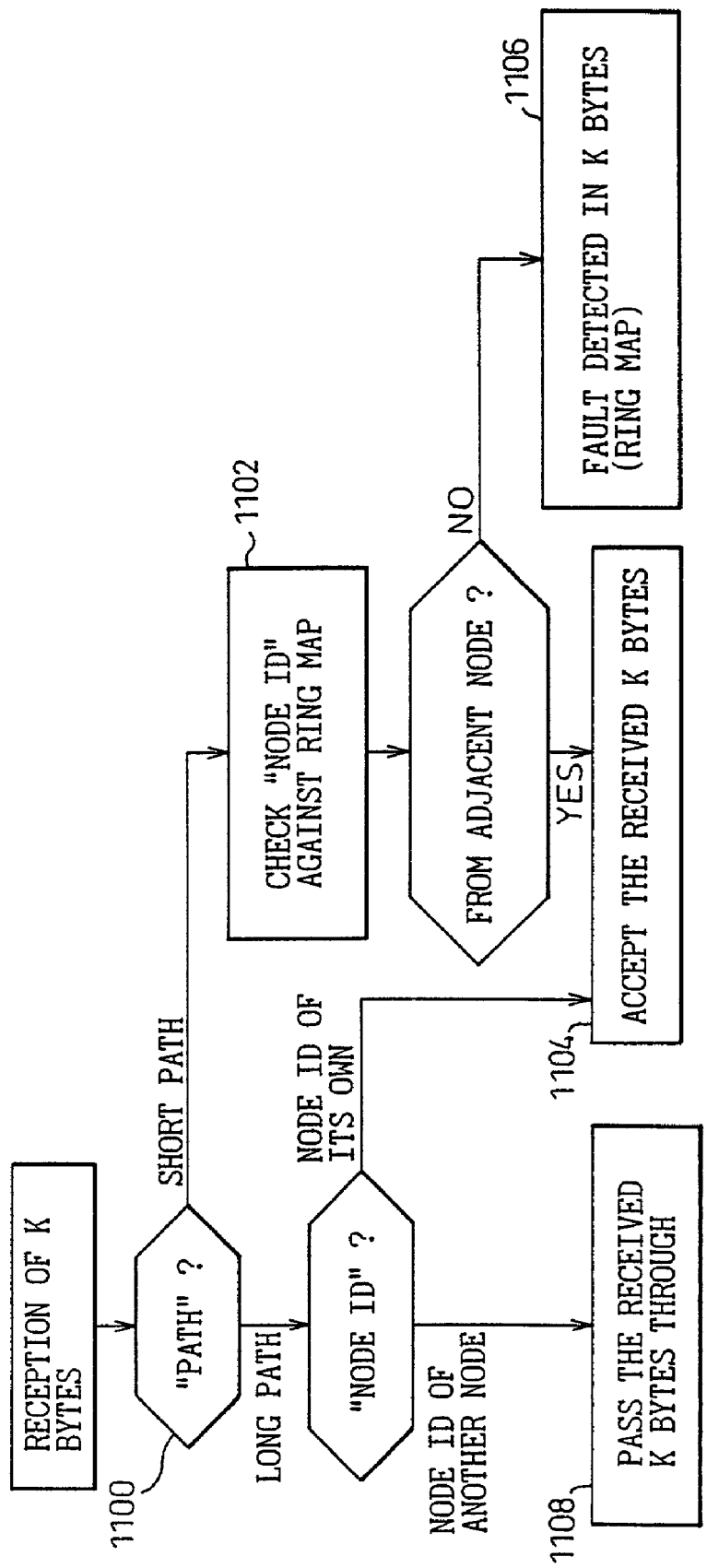
FIG. 6 is a flowchart illustrating the reception of the K bytes according to the first embodiment of the present invention.

FIG. 6 shows the processing performed when receiving the K bytes. When the K bytes are received, first the "PATH" field is checked (step 1100). If "PATH" indicates "short path", the receiving node at first determines that the K bytes are addressed to itself. Then, the receiving node checks the ring map to see whether the source node ID carried in the "NODE ID" field is the node ID of the adjacent node on the receiving side of the receiving node (step 1102). If it matches the node ID of the adjacent node, the receiving node acknowledges the K bytes and accepts them (step 1104). If they do not match, it is determined that the K bytes are faulty (or the ring map is faulty) (step 1106). If "PATH" indicates "long path", the "NODE ID" is interpreted as the destination node ID. If "NODE ID" matches the node ID of the receiving node, the receiving node determines that the K bytes are addressed to itself, and accepts the K bytes (step 1104). If the "NODE ID" does not match the node ID of the receiving node, then it is determined that the K bytes are addressed to another node, and the K bytes are passed onto the next node (step 1108).

In common with other methods described later, the provision of a mechanism for detecting the reception of faulty APS or the occurrence of a ring map mismatch is essential in the BLSR APS protocol in order to prevent erroneous switching operations in the event of the occurrence of a ring map mismatch or the reception of faulty APS. Since an erroneous connection can lead to a more serious consequence than a signal cutoff due to a failure does, the switching operation must be inhibited when a faulty condition is detected. For this reason, in the prior art, "DESTINATION NODE" and "SOURCE NODE" have been set in the K bytes, and it has been practiced to detect a faulty condition by checking these two pieces of information against the ring map. In the method of the present embodiment, "SOURCE NODE" is set in the K bytes in the case of the short path, and two pieces of information, "SOURCE NODE" and "PATH (SHORT)", are checked against the ring map for the detection of faulty APS or an illegal ring map. It is for this reason that the "NODE ID" field is used differently between the short path and the long path in this method.

According to the method of the present embodiment, as many nodes as can be distinguished by the 8-bit "NODE ID" can be identified on the ring. However, in the standard K1/K2 byte format, if bit 5 to bit 8 in K1 and bit 1 to bit 4 in K2 are all 0s, such a byte is called a "default K byte" and special meaning is assigned to it (that is, a code that applies in a transient state, for example, during a system power up, in which the K bytes cannot be produced normally). Accordingly, in the method of the present embodiment, since the node ID "0", where bit 5 to bit 8 in K1 and bit 1 to bit 4 in K2 are all 0s, cannot be used, the valid range of node IDs is from 1 to 255, which, from the standpoint of node identification, means that a maximum of 255 nodes can be connected on one ring.

Figure 7:
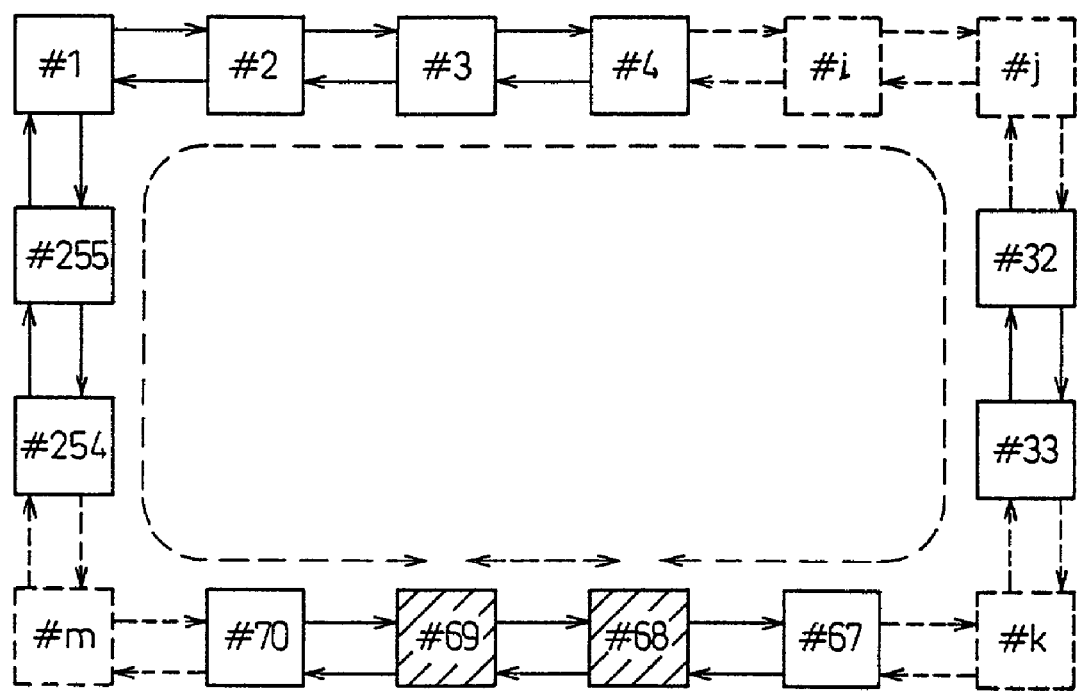
FIG. 7 is a diagram showing an example of the arrangement of nodes according to the first embodiment of the present invention.

An example of a ring consisting of 255 nodes will be described below. In FIG. 7, the ring is made up of nodes having unique IDs from #1 to #255 (some of the intermediate nodes are not shown). For clarity, it is assumed that the nodes are arranged in the clockwise direction in the order of ID numbers, and also that each node recognizes the location of every other node on the ring, for example, the node IDs of the adjacent nodes, in accordance with a prior art ring map generation method (in the prior art ring map generation method, it may become necessary to expand the node ID field when generating a ring map).

When there is no failure on the ring, each node sends the K bytes with [NR (No Request)] to its adjacent nodes over the short path. In the case of the short path transmission, the source node ID is set in the "NODE ID" field.

Figure 8:
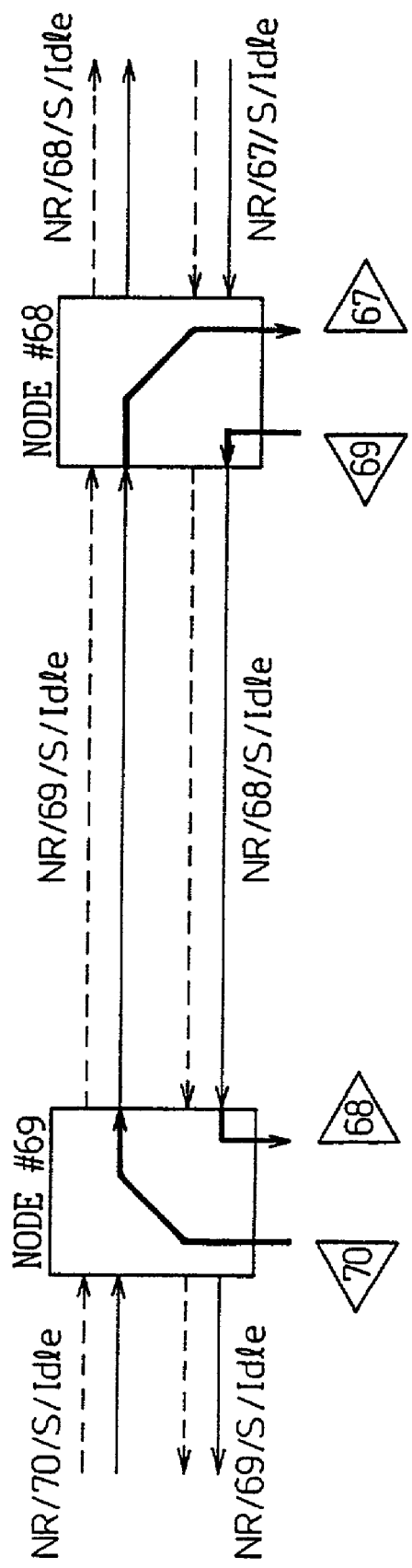
FIG. 8 is a diagram for explaining the transmission and reception of the K bytes when there is no failure.

Noting, for example, the nodes #68 and #69 shown in FIG. 8, the node #68 sets its own node ID [#68] in the "NODE ID" field, and sends the K bytes to the node on each side thereof over the short path. The node #69 also sets its own node ID [#69] in the "NODE ID" field, and sends the K bytes similarly.

The receiving node determines from the "PATH" information that the K bytes have been received over the short path, and recognizes the "NODE ID" in the K bytes as the "SOURCE NODE ID". The receiving node then checks to determine whether this ID matches the adjacent node ID that it recognizes from the ring map. Noting the node #69, the received K bytes show [NR/68/S/Idle]; since this matches the information that the adjacent node ID is #68, it can be determined that the received K bytes are legal (or that the ring map used for identification is reliable). If they do not match, it is determined that the received K bytes are illegal or that the ring map currently used for identification is not reliable, and the user is notified accordingly.

Figure 9:
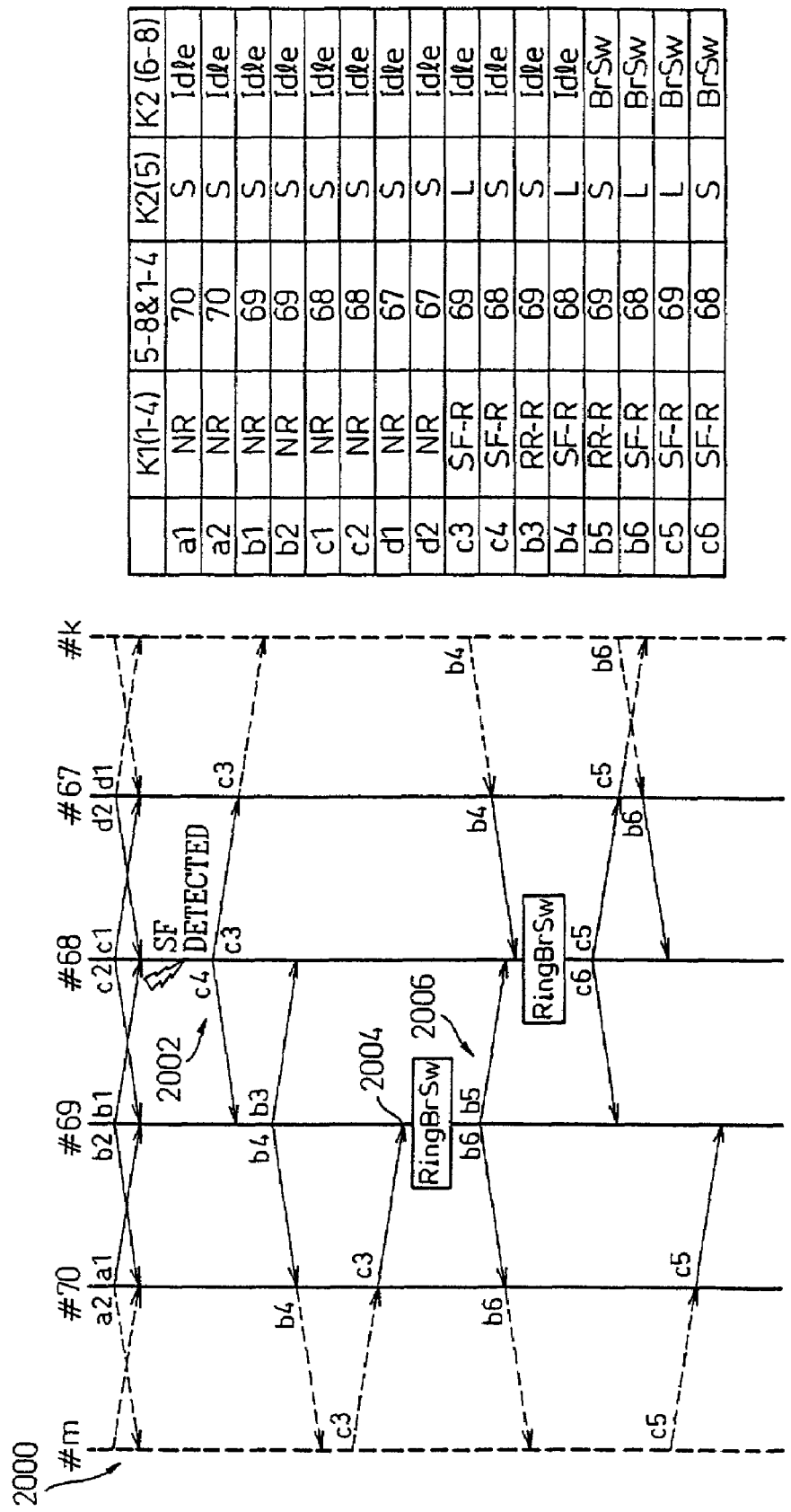
FIG. 9 is a diagram showing a sequence for transmission/reception of the K bytes in the event of the occurrence of a failure.

FIG. 9 shows a sequence for transmission/reception of the K bytes in the event of the occurrence of a failure. In FIG. 9, when there is no failure, NR messages a1, a2, b1, b2, c1, c2, d1, and d2 are being transferred between respective nodes (step 2000). Suppose here that a line failure has occurred on the line from #69 to #68. The node #68 that detected the failure sends K bytes c3 and c4 with a switching request to the adjacent node #69 in accordance with the APS protocol over both the short and long paths (in the case of a 2F-BLSR) to restore traffic by a ring switch (step 2002). Its own node ID #68 is set as the source node ID in the "NODE ID" field of the short path K bytes c4. On the other hand, for the long path K bytes c3, the adjacent node ID #69 acquired from the ring map is set to indicate the destination node. The K bytes are thus sent out on the respective paths.

The switching request carrying K bytes c3 (SF-R/69/L/ Idle) transmitted over the long path from the node #68 is received at all 253 intermediate nodes along the ring, but since the "NODE ID" field indicates #69 as the "DESTINATION NODE", each intermediate node recognizes that the K bytes are not addressed to itself, and passes them on to the next node.

Figure 10:
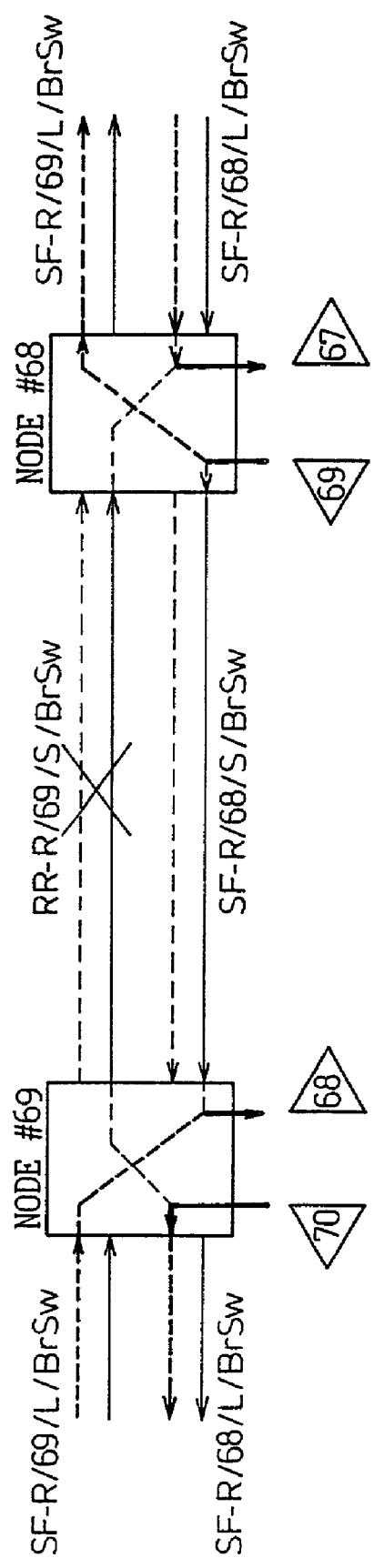
FIG. 10 is a diagram showing the state when ring switching is completed.

When the long path K bytes finally reach the node #69, the node #69 recognizes the K bytes addressed to itself and accepts them (step 2004). With the reception of the K bytes, the node #69 recognizes that it must perform a ring switch, and returns responses b5 and b6 to the node #68 (step 2006). In this case also, its own node ID #69 is set in the short path response, while the response destination node ID #68 is set in the long path response. FIG. 10 shows the state when the ring switching is completed.

Figure 11:
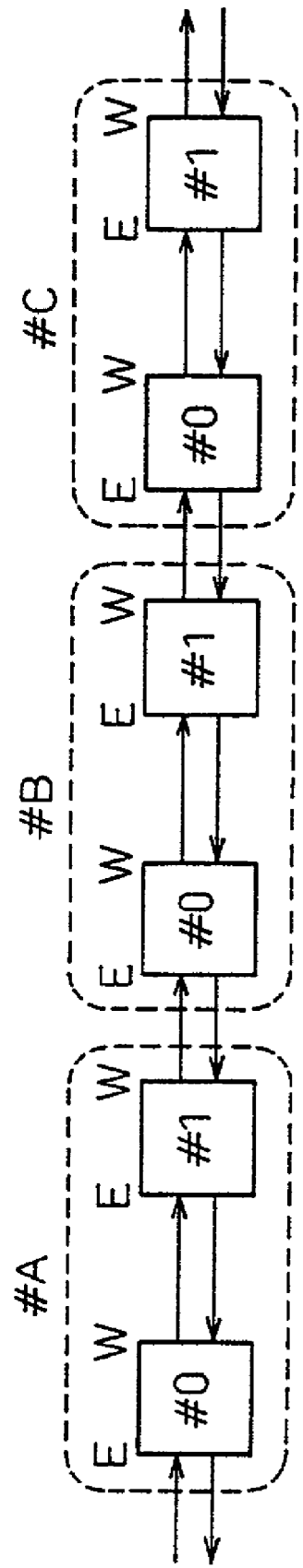
FIG. 11 is a diagram for explaining a second embodiment of the present invention.

In a second embodiment of the present invention, one of unlike IDs, for example, either #0 or #1, is assigned as the "NODE ID" to each node on the ring, as shown in FIG. 11. The nodes are arranged so that each node has an ID different from that of its adjacent nodes. Each pair of nodes having unlike IDs is formed as one group, and an ID (in the example of FIG. 11, #A, #B, or #C) is assigned to each such group on the ring.

The nodes are arranged in alternating fashion, such as #0, #1, #0, #1, and so on, and the ring is constructed with each pair of nodes forming a group. The conditions for constructing the ring are shown below.

|  | Adjacent Node on E Side | Adjacent Node on W Side |
| --- | --- | --- |
| Node #0 | Node #1 in Different Group | Node #1 in Same Group |
| Node #1 | Node #0 in Same Group | Node #0 in Different Group |

Of course, the order of #0 and #1 may be interchanged, provided that the same ordering is maintained throughout the ring.

Figure 12:
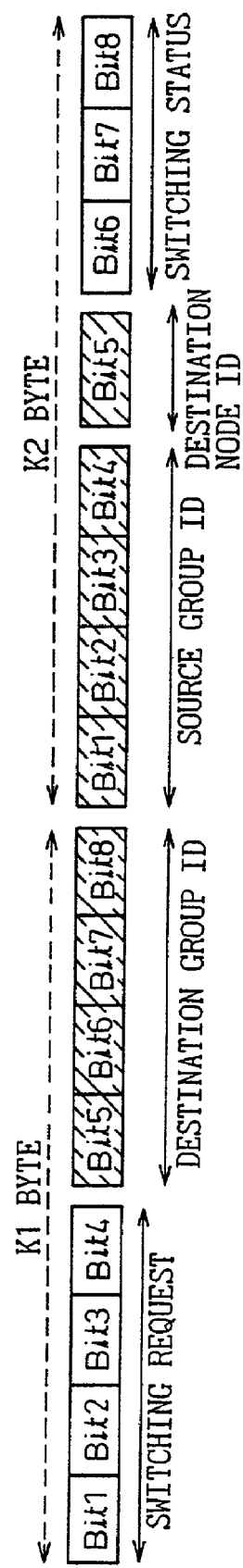
FIG. 12 is a diagram showing the format of K bytes according to the second embodiment of the present invention.

The K1/K2 byte format according to this method is shown in FIG. 12. Bit 5 to bit 8 in K1 are used to designate the "DESTINATION GROUP ID", bit 1 to bit 4 in K2 designate the "SOURCE GROUP ID", and bit 5 in K2 indicates the "DESTINATION NODE ID (#0 or #1)". Compared with the standard K byte format, it is seen that the "SOURCE NODE ID" information and "PATH" information are omitted.

In the method of the present embodiment, the "SOURCE NODE ID" information is not needed, because there are only two node IDs, #0 and #1, and the ring is constructed with one node ID alternating with the other so that any two adjacent nodes have different node IDs, which means that the node ID different from the ID carried in the "DESTINATION ID" field is the source node ID. It will be noted here that, in this method, the ring is always constructed with an even number of nodes.

Thus, in the K1/K2 byte format according to this method, the destination node is uniquely identified by the "DESTINATION GROUP ID" and "DESTINATION NODE ID", and the source node by the "SOURCE GROUP ID" and the node ID different from the "DESTINATION NODE ID".

The reason that the above method does not need the "PATH" information is that the path can be identified by identifying the side at which the K bytes have arrived and by checking the "DESTINATION" and "SOURCE" against the ring map. This will be explained in detail below.

First, the node ID and group ID information of each node on the ring is reflected into the ring map. That is, the ring map is generated by setting both the group ID and node ID in the area that was used to store only the node ID in a prior known topology creation method such as the method described in Japanese Patent Application No. 12-61092.

Figure 13:
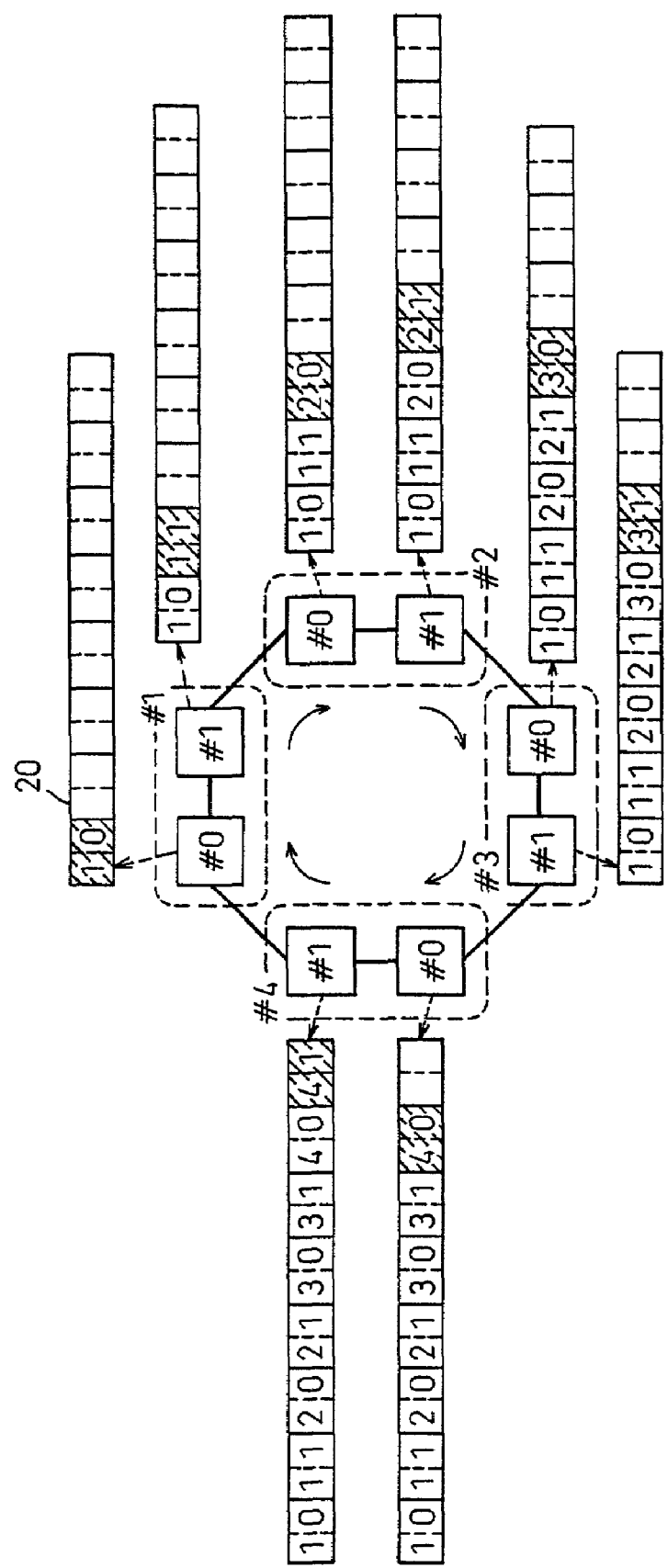
FIG. 13 is a diagram for explaining how a ring map is generated according to the second embodiment of the present invention.

FIG. 13 shows an example of a ring map generation procedure for a ring consisting of eight nodes arranged in four groups. A ring map generation request message 20 is circulated, starting from node #0 in group #1, and each node sets two items of data, "GROUP ID" and "NODE ID", in the area that was used in the prior art to store the node ID. By circulating this around the ring, the ring map is generated at each node.

Using this ring map, each node on the ring recognizes not only the location on the ring, but also the group and node IDs of the nodes located on both sides of it.

For example, nodes #0 and #1 in group #1 in FIG. 13 recognize the following information by using the ring map.

|  | Adjacent Node on E Side | Adjacent Node on W Side |
| --- | --- | --- |
| Node #0 | Node #1 in Group #4 (Different Group) | Node #1 in Group #1 (Same Group) |
| Node #1 | Node #0 in Group #1 (Same Group) | Node #0 in Group #2 (Different Group) |

Figure 14:
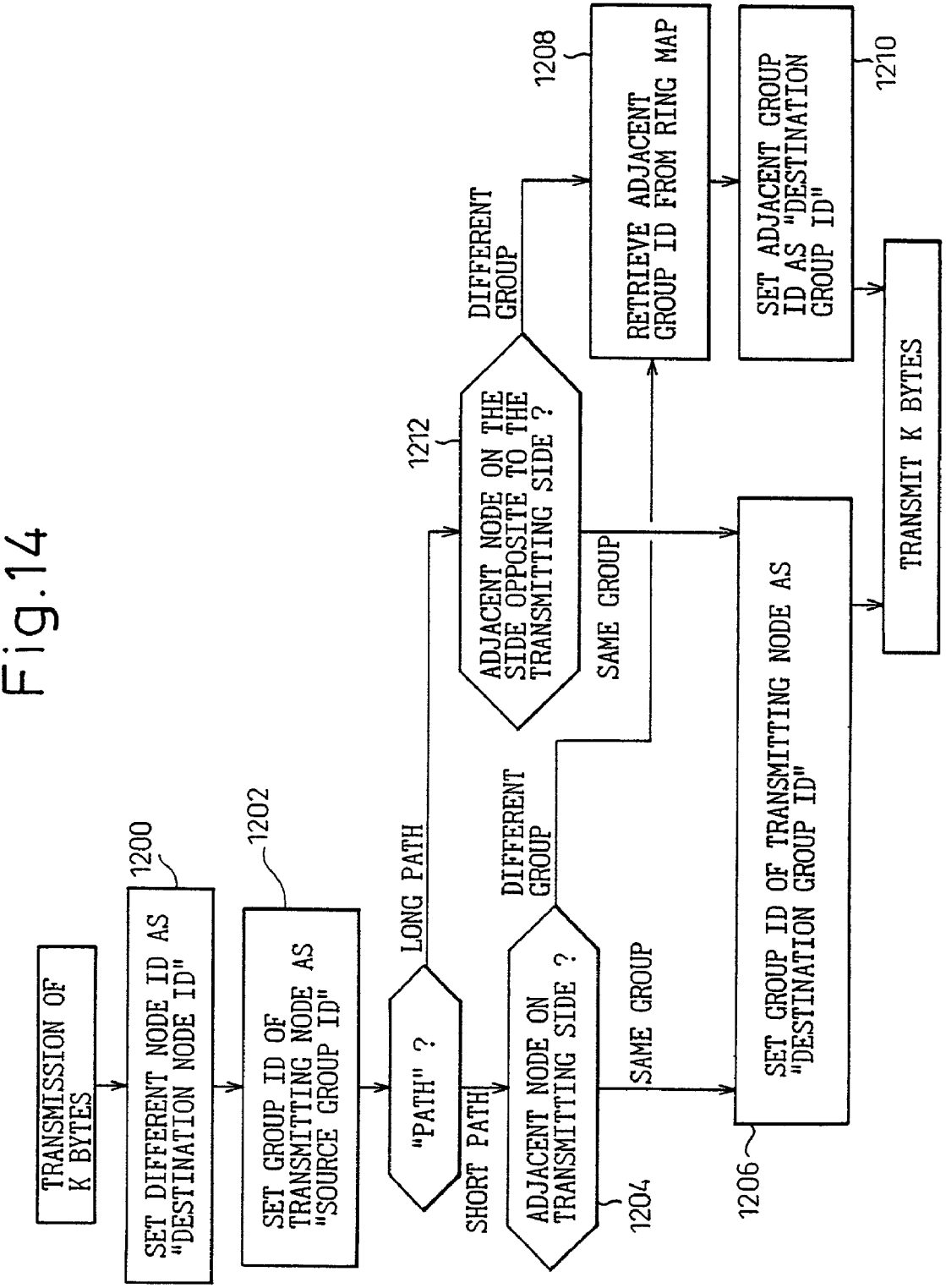
FIG. 14 is a flowchart illustrating the transmission of the K bytes according to the second embodiment of the present invention.

FIG. 14 shows the processing that the APS control unit 12 performs when transmitting the K bytes in accordance with the second embodiment of the present invention. At the node transmitting the K bytes, the destination node and the transmission path (transmitting side) are determined according to the switching request. Since the node ID of its adjacent node is always different from its own node ID (if #0, then #1, and vice versa), the node ID different from its own node ID is set as the "DESTINATION NODE ID" (step 1200). The group ID of the transmitting node is set as the "SOURCE GROUP ID" (step 1202). When transmitting the K bytes over the "short path", the transmitting node checks the group ID of the adjacent node on the transmitting side (step 1204). If the adjacent node is in the same group, the group ID of the transmitting node is set as the "DESTINATION GROUP ID" (step 1206). If the adjacent node is in a different group, the group ID of that adjacent node on the transmitting side is acquired from the ring map (step 1208), and this group ID is set as the "DESTINATION GROUP ID" (step 1210). When transmitting the K bytes over the "long path", the transmitting node checks the group ID of the adjacent node on the side opposite to the transmitting side (step 1212). If the adjacent node is in the same group, the group ID of the transmitting node is set as the "DESTINATION GROUP ID" (step 1206). If the adjacent node is in a different group, the group ID of that adjacent node located on the side opposite to the transmitting side is acquired from the ring map (step 1208), and this group ID is set as the "DESTINATION GROUP ID" (step 1210).

In the configuration example of FIG. 11, the "DESTINATION GROUP ID" in the K bytes transmitted from each node in group #B is as follows.

| Path | Transmit to E Side | | Transmit to W Side | |
| --- | --- | --- | --- | --- |
|  | Short Path | Long Path | Short Path | Long Path |
| Node #0 | #A | #B | #B | #A |
| Node #1 | #B | #C | #C | #a |

Figure 15:
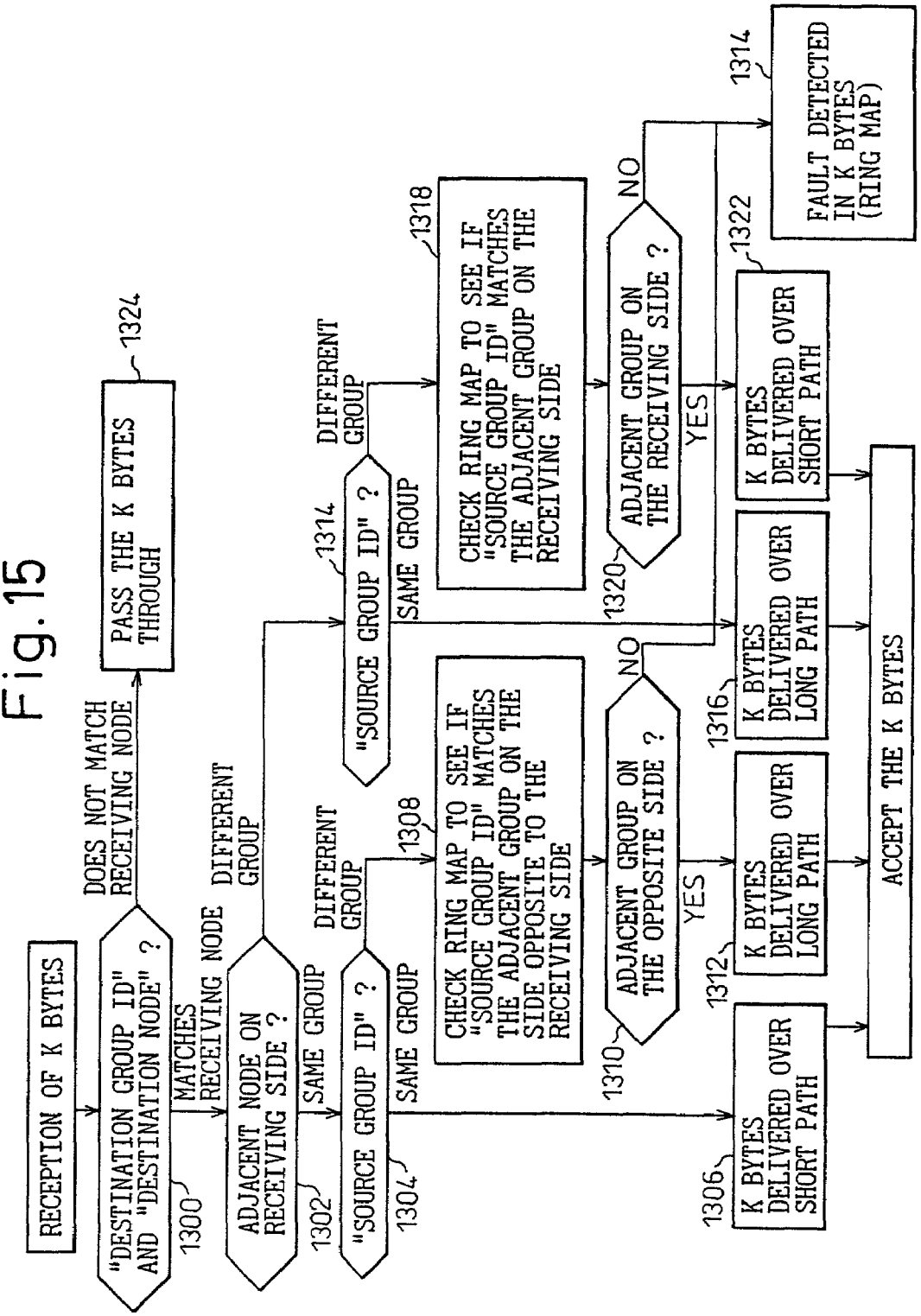
FIG. 15 is a flowchart illustrating the reception of the K bytes according to the second embodiment of the present invention.

FIG. 15 shows the processing performed when receiving the K bytes. The node that received the K bytes first checks the "DESTINATION GROUP ID" and "DESTINATION NODE ID" (step 1300), and if both IDs match the corresponding IDs of the receiving node, the receiving node at first determines that the K bytes are addressed to itself. Next, the receiving node checks the group ID of the adjacent node on the side at which the K bytes arrived (step 1302). If the group ID of the adjacent node on the receiving side is the same as that of the receiving node, the receiving node next checks the "SOURCE GROUP ID" (step 1304). If the "SOURCE GROUP ID" is the same as the group ID of the receiving node, the receiving node interprets that the K bytes have been delivered over the "short path" (step 1306). If the "SOURCE GROUP ID" is different from the group ID of the receiving node, the receiving node then checks it against the ring map (step 1308) to see if it matches the group ID of the adjacent node on the side opposite to the receiving side (step 1310). If they match, the receiving node interprets that the K bytes have been delivered over the "long path" (step 1312). If they do not match, it is determined that the K bytes are faulty (or the ring map is faulty) and an alarm is reported (step 1314).

If the group ID of the adjacent node on the receiving side is different from that of the receiving node, the receiving node next checks the "SOURCE GROUP ID" (step 1314). If the "SOURCE GROUP ID" is the same as the group ID of the receiving node, the receiving node interprets that the K bytes have been delivered over the "long path" (step 1316). If the "SOURCE GROUP ID" is different from the group ID of the receiving node, the receiving node then checks it against the ring map (step 1318) to see if it matches the group ID of the adjacent node on the receiving side (step 1320). If they match, the receiving node interprets that the K bytes have been delivered over the "short path" (step 1322). If they do not match, an alarm is reported (step 1314).

If either the "DESTINATION GROUP ID" or the "DESTINATION NODE ID" is different from the corresponding ID of the receiving node, the receiving node determines that the K bytes are addressed to another node, and passes the K bytes onto the next node (step 1324).

In the configuration example of FIG. 11, the "SOURCE GROUP ID" in the valid received K bytes, on the receiving side of each node in #B, and its interpretation are as follows.

|  | Received from E Side | Interpretation | Received from W Side | Interpretation |
|---|---|---|---|---|
| Node #0 | #A | Short Path Request from #1 in #A | #A | Long Path Request from #1 in #A |
|  | #B | Long Path Request from #1 in #B | #B | Short Path Request from #1 in #B |
| Node #1 | #B | Short Path Request from #0 in #B | #B | Long Path Request from #0 in #B |
|  | #C | Long Path Request from #0 in #C | #C | Short Path Request from #0 in #C |

Any other "SOURCE GROUP ID" than those defined above can be detected as faulty K bytes (or a faulty ring map).

According to the above method, as many groups as can be distinguished by the "DESTINATION/SOURCE GROUP IDs" of four bits each can be identified on the ring. This means that as many nodes as the number of groups multiplied by two can be connected on the ring. However, in the standard K1/K2 byte format, if bit 5 to bit 8 in K1 and bit 1 to bit 4 in K2 are all 0s, the byte is then recognized as the "default K byte"; therefore, the group ID of "0" cannot be used in the above method. As a result, the above method can set 15 group IDs from 1 to 15, which means that a maximum of 30 nodes (15 groups×2 nodes) can be connected on one ring.

Figure 16:
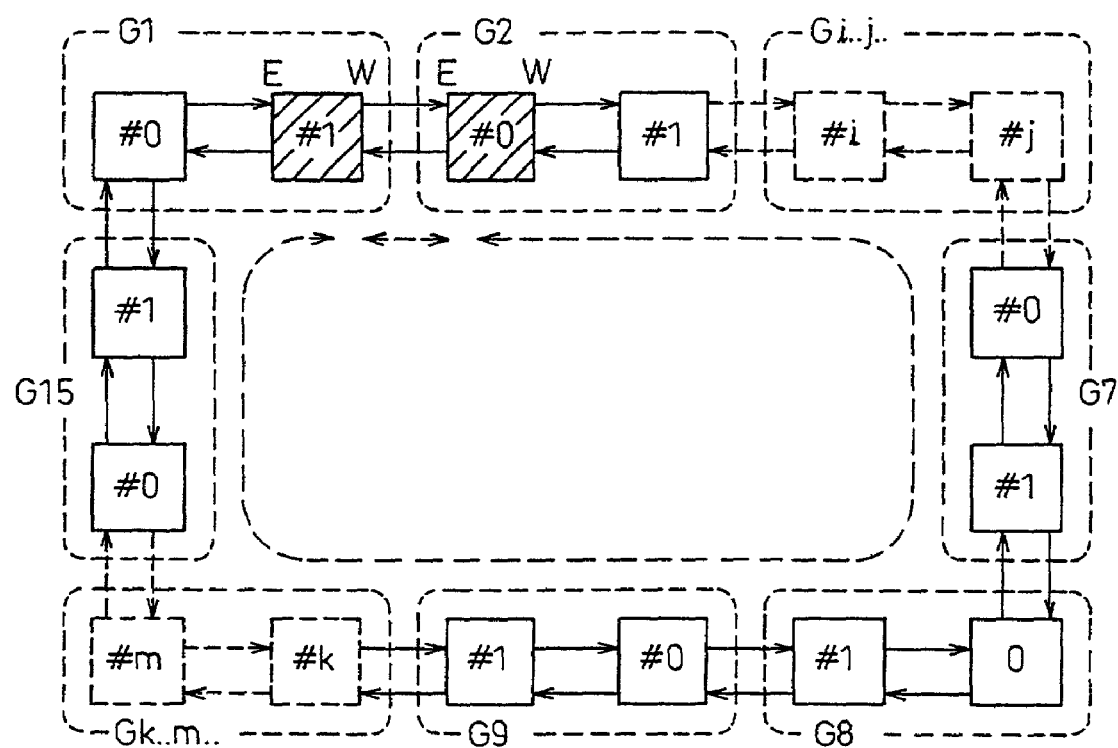
FIG. 16 is a diagram showing an example of the arrangement of nodes according to the second embodiment of the present invention.

FIG. 16 shows an example in which 30 nodes are connected on one ring. The nodes are each assigned one of two node IDs, #0 or #1, and are arranged so that each node has a node ID different from that of its adjacent nodes, as shown in FIG. 16. Further, each pair of nodes #0 and #1 is formed as one group and arranged so that a different group is adjacent on the E side of the node #0, and the respective groups are assigned unique group IDs of G1 to G15 (some of the intermediate node groups are not shown here). For clarity, it is assumed that the groups are arranged in the clockwise direction in the order of ID numbers.

Suppose here that a ring map generation request for the generation of a ring map is sent in the clockwise direction, starting from the node #0 in G1. Each node on the ring that received this request sets the "GROUP ID" and "NODE ID" of its own, and eventually a ring map such as shown below (designated [GROUP ID, NODE ID]) is constructed and recognized by all the nodes on the ring. ←E [1, 0] [1, 1] [2, 0] [2, 1] [ , ] [ , ] [7, 0] [7, 1] [8, 0] [8, 1] [9, 0] [9, 1] [ , ] [ , ] [15, 0] [15, 1] W→

With this ring map and the node ID and group ID assigned to itself, each node recognizes the group IDs and node IDS of the nodes adjacent on the E and W sides of it. More specifically, since the nodes #0 and #1 are arranged alternately, it is self-evident that each node has a node ID different from that of each of its adjacent nodes. If the adjacent node is in the same group, the group ID is the same, and if the adjacent node is in a different group, its group ID can be acquired from the ring map. For example, node #1 in G1 and node #0 in G2 recognize their adjacent sides as follows.

|  | Adjacent Node on E Side | | Adjacent Node on W Side | |
|---|---|---|---|---|
|  | Group ID | Node ID | Group ID | Node ID |
| Node #1 in G1 | G1 (Same Group) | #0 | G2 (Different Group) | #0 |
| Node #0 in G2 | G1 (Different Group) | #1 | G2 (Same Group) | #1 |

When there is no failure on the ring, each node sends K bytes with [NR (No Request)] to its adjacent nodes over the short path. As an example, the settings for "DESTINATION GROUP ID", "SOURCE GROUP ID", and "NODE ID" are shown below when node #1 in G1 and node # in G2 send the K bytes to both sides over the short path.

|  | Short Path to E Side | | | Short Path to W Side | | |
|---|---|---|---|---|---|---|
|  | Destination Group ID | Source Group ID | Destination Node | Destination Group ID | Source Group ID | Destination Node |
| Node #1 in G1 | G1 | G1 | #0 | G2 | G1 | #0 |
| Node #0 in G2 | G1 | G2 | #1 | G2 | G2 | #1 |

When a failure occurs, K bytes with a switching request are sent over the long path. The settings for the respective fields are shown below when sending the K bytes to both sides over the long path.

|  | Long Path to E Side | | | Long Path to W Side | | |
| --- | --- | --- | --- | --- | --- | --- |
|  | Destination Group ID | Source Group ID | Destination Node | Destination Group ID | Source Group ID | Destination Node |
| Node #1 in G1 | G2 | G1 | #0 | G1 | G1 | #0 |
| Node #0 in G2 | G2 | G2 | #1 | G1 | G2 | #1 |

Next, a description will be given of the operation performed when restoring traffic, by a ring switch, in the event of the occurrence of a failure on the line from node #1 in G1 to node #0 in G2. Since the node #0 in G2 detects the occurrence of the failure in the E direction, the node #0 recognizes that it must send a switching request addressed to the node #1 in G1 over the short path in the E direction and over the long path in the W direction. In this case, E: [SF-R/G1/G2/1/Idle] and W: [SF-R/G1/G2/1/Idle] are sent as the K bytes according to the previously given table.

The K bytes sent over the long path are received at each intermediate node along the ring, but since the "DESTINATION GROUP ID" indicates G1, each intermediate node determines that the K bytes are not addressed to itself, and passes them onto the next node. The long path K bytes arrive at the node #0 in G1, but in this case, the "DESTINATION NODE ID" does not match though the "DESTINATION GROUP ID" matches; therefore, the K bytes are passed therethrough and finally arrive at the E side of the node #1 in G1.

Figure 18:
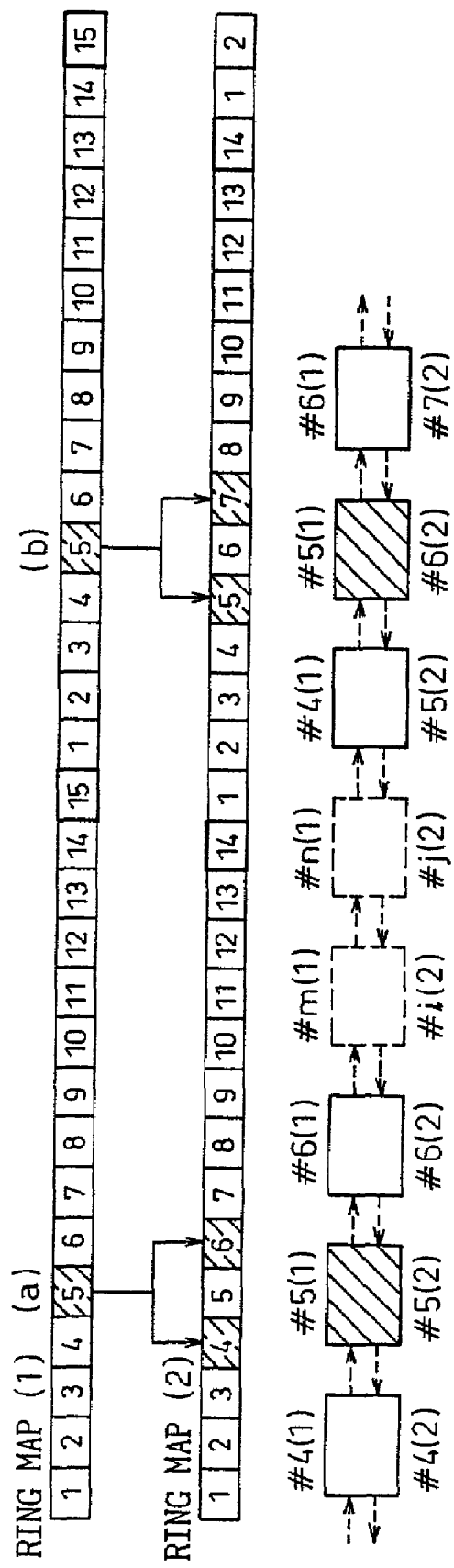
FIG. 18 is a diagram for explaining a third embodiment of the present invention.

Since the K bytes indicating G2 as the source have been received from the E side adjacent to the node in the same group G1, the node #1 in G1 determines that the K bytes have been delivered over the long path, and performs a ring switch. The node #1 in G1 also receives the K bytes indicating G2 as the source from the W side adjacent to a different group, and therefore recognizes that these K bytes have been delivered over the short path. As a result, at the node #1 in G1 and the node #0 in G2, the valid K bytes (addressed to the respective nodes) are as shown below. K byes received from E side K bytes received from W side FIG. 18 is a diagram for explaining a third embodiment of the present invention. In this embodiment, two kinds of node IDs are assigned to each node, and two ring maps respectively corresponding to the first and second node IDs are recognized by all the nodes on the ring.

The first and second node IDs are assigned such that each node is uniquely identified throughout the ring by a combination of its own node ID defined in the first ring map and the node IDs of its adjacent nodes defined in the second ring map (i.e., the relationship of the node to its adjacent nodes).

In the example of FIG. 18, the first ring map, which assigns the node IDs by repeating a sequence of node IDs #0 (1) to #15 (1), and the second ring map, which assigns the node IDs by repeating a sequence of node IDs #0 (2) to #14 (2), are used. Here, the number in parentheses indicates the kind of ring map (1 or 2). In the example of FIG. 18, there are a plurality of nodes assigned the same node ID#5 (1) on the ring, as indicated at (a) and (b), but since the node #5 (1) at (a) has nodes #4 (2) and #6 (2) as its adjacent nodes while the node #5 (1) at (b) has nodes #5 (2) and #7 (2) as its adjacent nodes, these two nodes #5 (1) can be distinguished from each other by checking their adjacent node combinations against the first and second ring maps.

Figure 19:
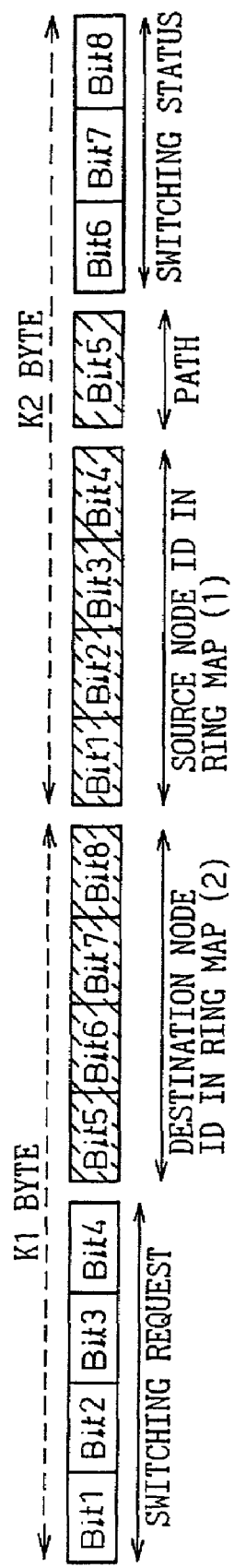
FIG. 19 is a diagram showing the format of K bytes according to the second embodiment of the present invention.

The K1/K2 byte format according to this embodiment is shown in FIG. 19.

In this embodiment, each node is identified by the adjacent node relationship of the "DESTINATION NODE ID" and "SOURCE GROUP ID" by checking the IDs contained in the message against the first and second ring maps; therefore, the "DESTINATION NODE ID" and "SOURCE GROUP ID" contained in the message may be defined differently from the illustrated example, that is, the former may be defined as the first node ID and the latter as the second node ID.

To generate the first and second ring maps based on the first and second IDs, a field indicating which of the first and second IDs is requested is newly added in a prior art topology creation method, for example, in "RING CONSTRUCTION METHOD AND NODE DEVICE FOR THE SAME" described in Japanese Patent Application No. 12-61092.

Each node that received the ring map generation request sets the first or the second ID of its own, whichever specified

| Destination Group | Source Group | Destination | Path Interpretation | Destination Group | Source Group | Destination | Path Interpretation |
| --- | --- | --- | --- | --- | --- | --- | --- |
| Node #1 in G1 | | | | | | | |
| G1 | G1 | #1 | Short | G1 | G1 | #1 | Long |
| G1 | G2 | #1 | Long | G1 | G2 | #1 | Short |
| Node #0 in G2 | | | | | | | |
| G2 | G1 | #0 | Short | G2 | G1 | #0 | Long |
| G2 | G2 | #0 | Long | G2 | G2 | #0 | Short |

If the K bytes are addressed to the receiving node ("DESTINATION GROUP ID" and "DESTINATION NODE ID" both match the corresponding IDs of the receiving node) but do not match any of the above combinations, then it can be determined that the K bytes are faulty (or the ring map is faulty).

Figure 17:
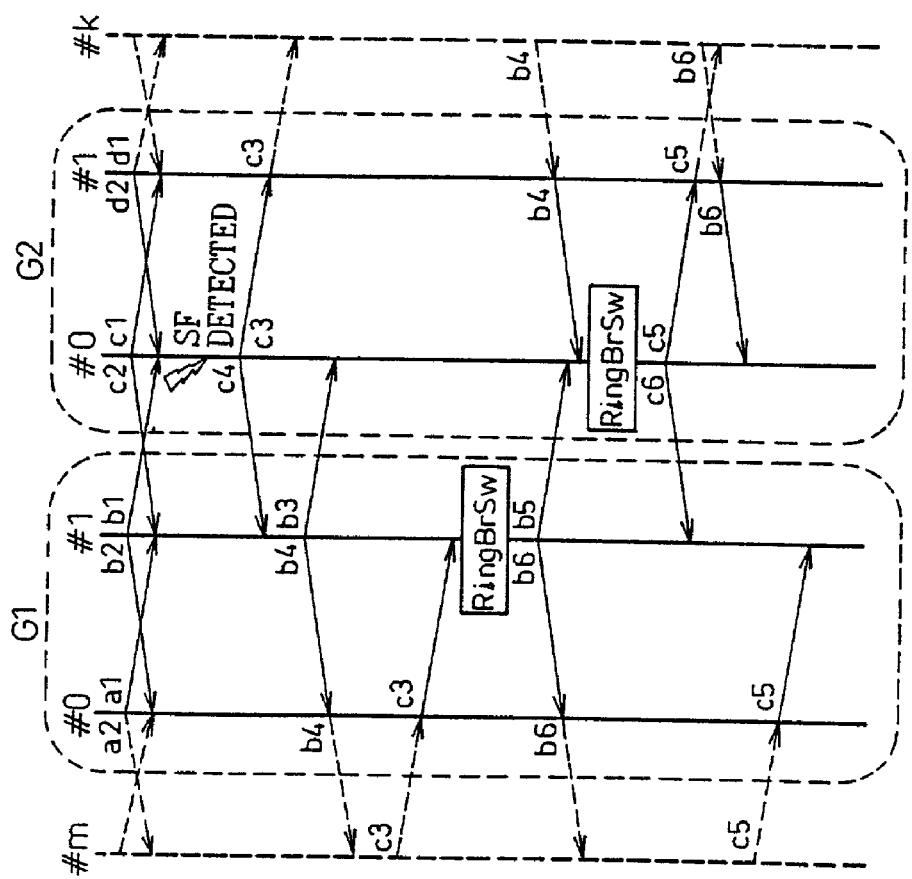
FIG. 17 is a diagram showing a sequence for transmission/reception of the K bytes in the event of the occurrence of a failure.

FIG. 17 shows a sequence of APS switching performed to accomplish a ring switch between G1#1 and G2#0.

in the field. The two ring maps are generated by performing this procedure for the first and second IDs.

Figure 20:
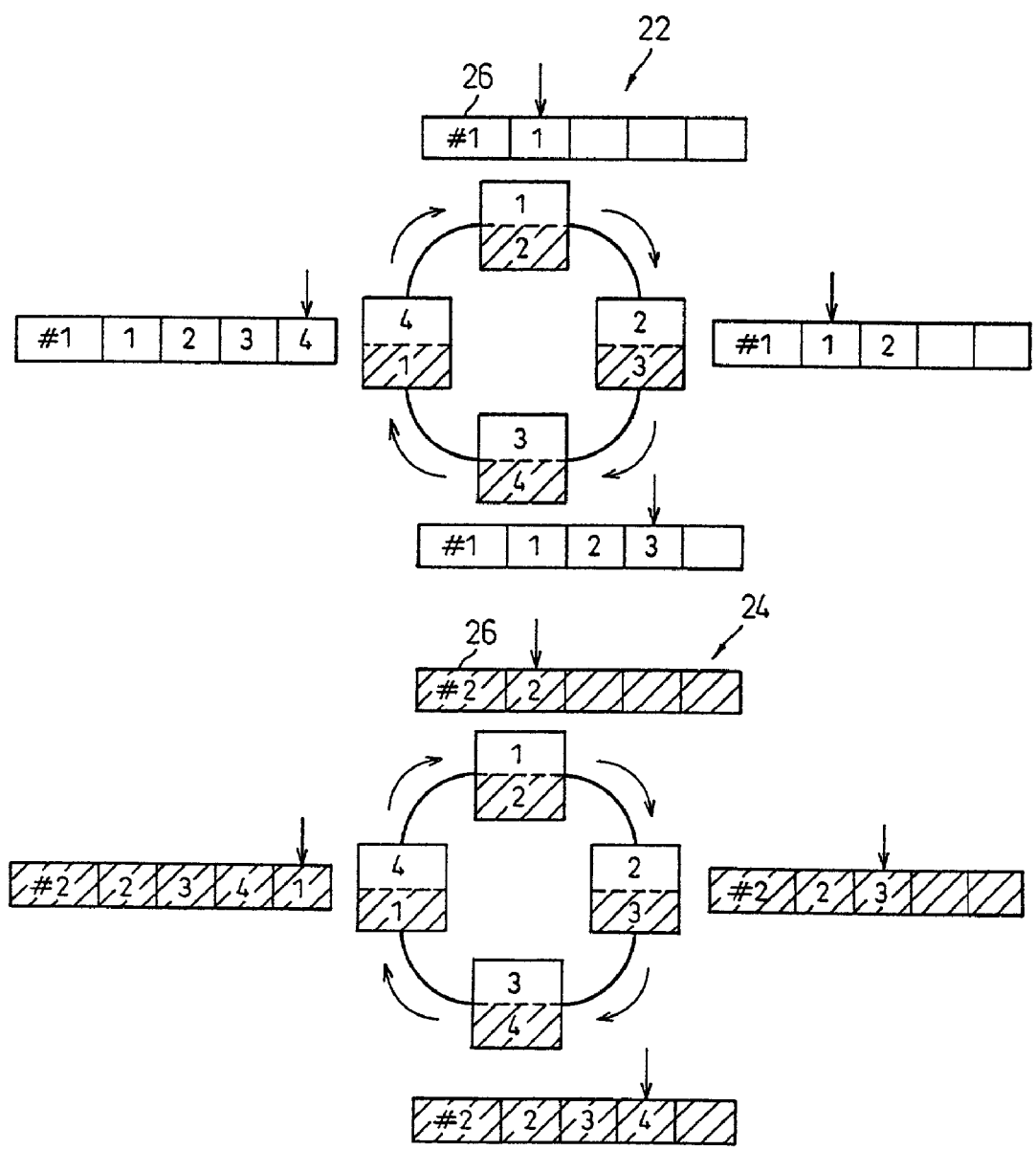
FIG. 20 is a diagram for explaining how ring maps are generated according to the third embodiment of the present invention.

FIG. 20 shows an example of the procedure for generating the first and second ring maps. As an example, ring map generation request messages 22 and 24 each contain at the head of the message a field indicating which ID, the first or the second ID, is to be collected. The messages 22 and 24 both start from the node with the first node ID #1; here, since the message 22 requests the generation of the ring map with the first node ID, each node sets the first node ID of its own for the generation of the first ring map. Likewise, since the message 24 requests the generation of the ring map with the second node ID, each node sets the second node ID of its own for the generation of the second ring map. With the first and second ring maps, each node on the ring can not only identify the node location on the ring, but also recognize its adjacent nodes.

Figure 21:
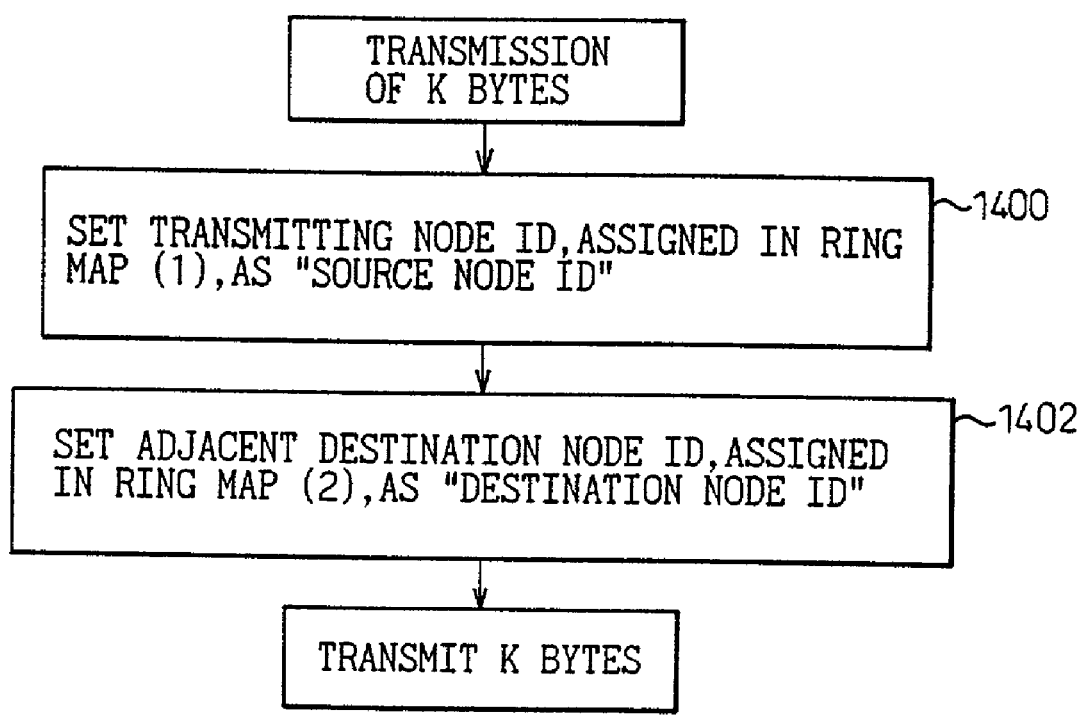
FIG. 21 is a flowchart illustrating the transmission of the K bytes according to the third embodiment of the present invention.

FIG. 21 shows the processing performed when transmitting the K bytes. At the node transmitting the K bytes, the destination node is determined according to the switching request. The node ID (1) of the transmitting node, assigned in the ring map (1), is set as the "SOURCE NODE ID" (step 1400). The node ID (2) of the adjacent destination node, assigned in the ring map (2), is set as the "DESTINATION NODE ID" (step 1402).

Alternatively, the ring map (1) and the ring map (2) may be interchanged, and the "SOURCE NODE ID" assigned in the ring map (2) and the "DESTINATION NODE ID" assigned in the ring map (1) may be transmitted, provided that the same convention is used at both the transmitting and receiving ends, as previously noted. As long as the "SOURCE NODE ID" and "DESTINATION NODE ID" are node IDs assigned in different ring maps, any particular node on the ring can be identified by its adjacent node relationship.

Figure 22:
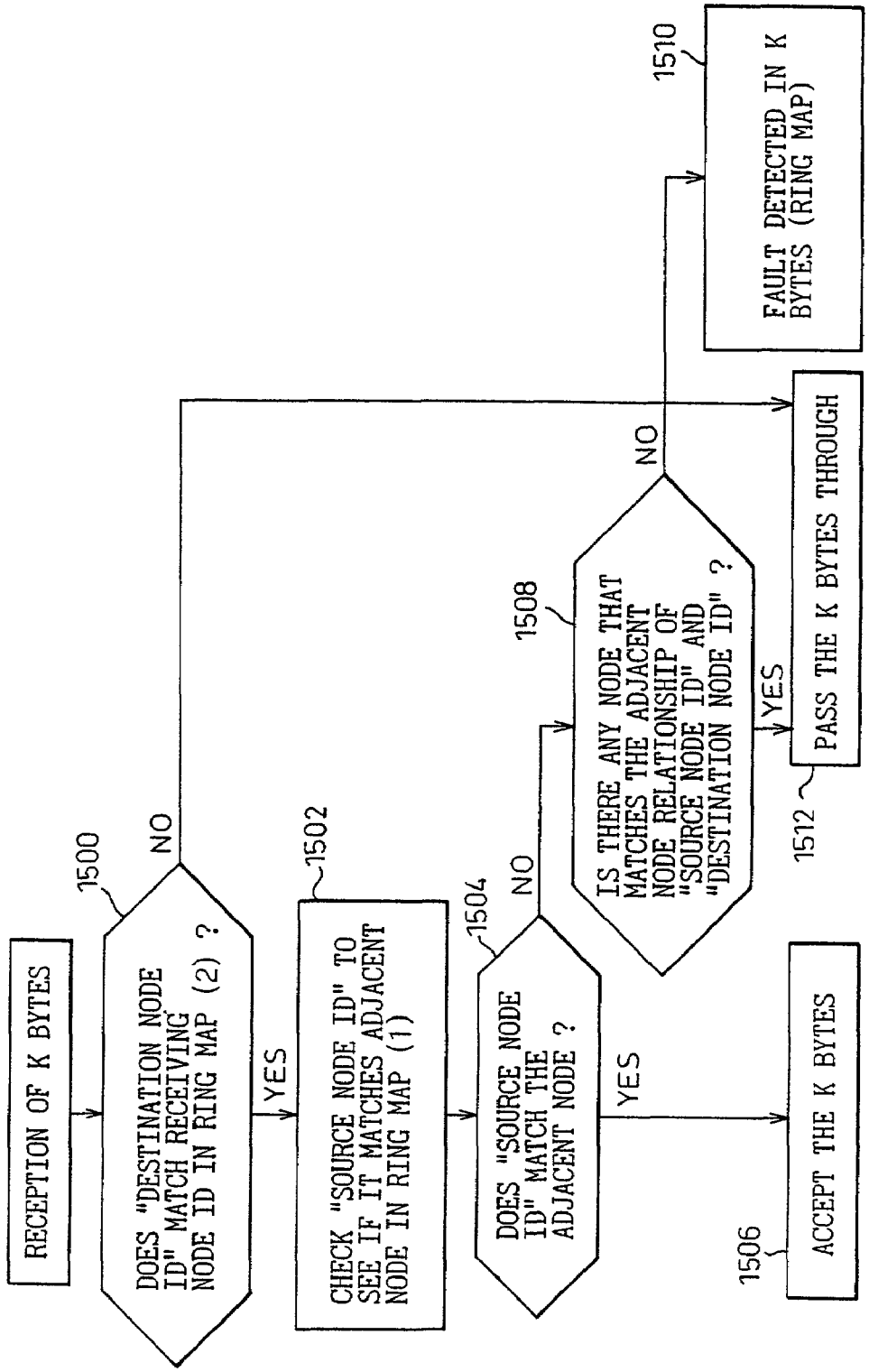
FIG. 22 is a flowchart illustrating the reception of the K bytes according to the third embodiment of the present invention.

FIG. 22 shows the processing performed when receiving the K bytes. The node that received the K bytes first checks the "DESTINATION NODE ID" (step 1500). If the "DESTINATION NODE ID" matches its own node ID assigned in the ring map (2), the receiving node then checks to determine whether the "SOURCE NODE ID" matches the adjacent node in the ring map (1) (step 1502). If it matches the adjacent node (step 1504), then the receiving node determines that the K byte are addressed to itself, and accepts them (step 1506). If it does not match the adjacent node, the ring maps (1) and (2) are checked to see if there is any node on the ring that matches the adjacent node relationship of the "SOURCE NODE ID" and "DESTINATION NODE ID" (step 1508). If there is no such node, it is determined that the K bytes are illegal (or the ring map is illegal), and an alarm is reported (step 1510). If there is a, matching node, it is determined that the K bytes are addressed to that nodes and the K bytes are passed through (step 1512). On the other hand, if the "DESTINATION NODE ID" does not match its own node ID (step 1500), the receiving node determines that the K bytes are addressed to another node, and passes them to the next node (step 1512).

According to the above method, as many nodes as the number of possible adjacent node combinations of the "DESTINATION/SOURCE IDs" of four bits each can be identified on the ring. However, in the standard K1/K2 byte format, if bit 5 to bit 8 in K1 and bit 1 to bit 4 in K2 are all 0s, such a byte is recognized as the "default K byte"; therefore, in the above method, "0" cannot be used for the "DESTINATION/SOURCE IDs". As a result, in the above method, if a sequence of IDs from 1 to 15 and a sequence of IDs from 1 to 14 are used, adjacent node relationships up to the number equal to the least common multiple of 15 and 14 can be uniquely defined, which means that a maximum of 210 (15×14) nodes can be connected on one ring. Furthermore, if the group identification based on the first and second group IDs as practiced in the third embodiment is employed in the group ID assignment in the foregoing second embodiment, it becomes possible to identify a larger number of nodes. In this way, the first to third embodiments of the invention can be combined with each other so that a larger number of nodes can be identified.

Figure 23:
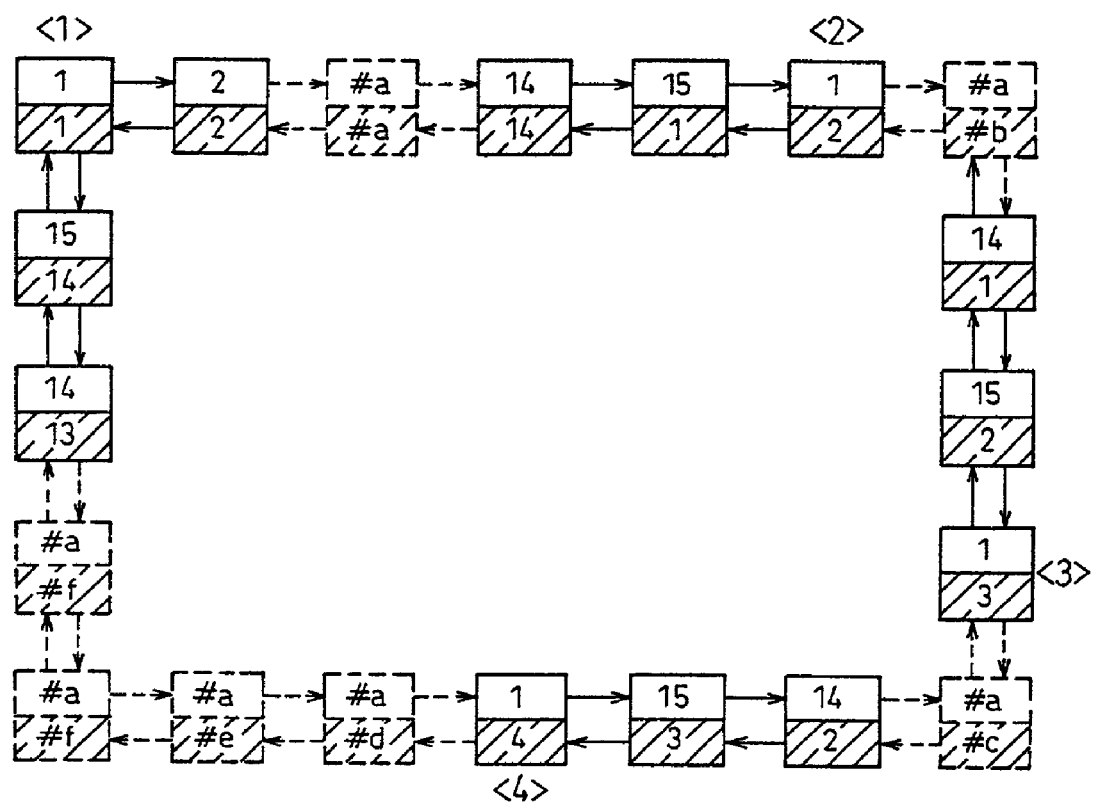
FIG. 23 is a diagram showing an example of the arrangement of nodes according to the third embodiment of the present invention.

Operation of the third embodiment will be described when 210 nodes are installed on one ring. FIG. 23 shows an example of the ring configuration in which IDs 1 to 15 as the first node IDs and IDs 1 to 14 as the second node IDs are respectively set in sequence in the clockwise direction, both starting from the node at the upper left corner.

Suppose that the node <1> at the upper left corner issues first and second ring map generation requests, both in the clockwise direction, for the generation of two ring maps. In response to the respective requests, each node sets the first and second node IDs of its own. Eventually, the following two ring maps are generated and recognized by all the nodes on the ring.

First ring map: ←E [1, 2, . . . , 14, 15, 1, . . . , 14, 15, 1, . . . , 14, 15] W→

Second ring map: ←E [1, 2, . . . , 14, 1, 2, . . . , 1, 2, 3, . . . , 2, 3, 4, . . . , 13, 14] W→

When the node IDs are set in the above manner, each node will have a unique combination of first and second node IDS as well as a unique combination of adjacent nodes on the ring.

For example, if the two node IDs are described as first/second as shown in Table 10, then the node <1> has a node ID combination 1/1 and its adjacent nodes have node ID combinations 15/14 and 2/2, respectively, and the node <2> has a node ID combination 1/2 and its adjacent nodes have node ID combinations 15/1 and 2/3, respectively.

In the above setting example, there are 14 nodes that have "1" as the first node ID, but each node can be uniquely identified by checking its relationship with the second node IDs of its adjacent nodes, as described above.

| Attention Node ID | Adjacent Node ID First/Second | |
|---|---|---|
| First/Second | E Side | W side |
| <1> | 1/1 | 15/14 | 2/2 |
| <2> | 1/2 | 15/13 | 2/3 |
| <3> | 1/3 | 15/12 | 2/4 |
| <4> | 1/4 | 15/11 | 2/5 |
| <5> | 1/5 | 15/10 | 2/6 |
| <6> | 1/6 | 15/9 | 2/7 |
| <7> | 1/7 | 15/8 | 2/8 |
| <8> | 1/8 | 15/7 | 2/9 |
| <9> | 1/9 | 15/6 | 2/10 |
| <10> | 1/10 | 15/5 | 2/11 |
| <11> | 1/11 | 15/4 | 2/12 |
| <12> | 1/12 | 15/3 | 2/13 |
| <13> | 1/13 | 15/2 | 2/14 |
| <14> | 1/14 | 15/1 | 2/1 |

When there is no failure on the ring, each node sends K bytes with [NR] to its adjacent nodes over the short path. In this case, the second node ID of the adjacent destination node is set as the "DESTINATION NODE ID", and the first node ID of the sending node is set as the "SOURCE NODE ID". In the example of the node <1>, E: [NR/14/1/S/Idle] and W: [NR/2/2/S/Idle] are sent out as the K bytes.

The K bytes are set in the same way when transmitting them over the long path in the event of the occurrence of a failure. As an example, a switching operation at the node <1> will be described when a failure occurs on the line from

1 to #2. In this case, the node #2 adjacent to the node <1>, which detected the failure, sends a switching request over the short path in the E direction and over the long path in the W direction. In the K bytes to be transmitted over the long path in the W direction, the second node ID "1" of the destination node #1 is set as the "DESTINATION NODE ID", and the first node ID "2" of the source node #2 is set as the "SOURCE NODE ID". The K bytes sent out on the long path pass through all 208 nodes along the ring, but since the "DESTINATION NODE ID" indicates "1", any node that does not have a second node ID "1" easily recognizes that the K bytes are not addressed to itself, and passes them through.

Node #15 adjacent on the E side of the node <2> has "1" as its second node ID, and therefore accepts the K bytes at first. However, since the first node IDs of the adjacent nodes recognized by the node #15 are "14" and "1" neither of which matches the "SOURCE NODE ID", i.e., "2", carried in the K bytes, the node #15 recognizes that the K bytes are not addressed to itself, and passes them through. At this time, the first and second ring maps are checked to see whether there is any node on the ring that matches the adjacent node relationship of the "SOURCE NODE ID" and "DESTINATION NODE ID" carried in the received K bytes. If there is no node on the ring that matches this adjacent node relationship, an alarm can be reported by determining that the received K bytes are faulty (or the first or second ring map is faulty).

Before the K bytes finally reach the node <1>, there are 14 other nodes whose second node ID is "1", but with the above checking operation, the K bytes are passed through such nodes and finally delivered to the node #1 at <1>. The node #1 at <1> first accepts the K bytes because the "DESTINATION NODE ID" indicates "1" which matches the second node ID "1" of the node #1. Next, the node #1 checks the "SOURCE NODE ID" which indicates "2" and matches the second node ID of the adjacent node; therefore, the node #1 recognizes that the K bytes are addressed to itself, and performs the switching operation.

Figure 24:
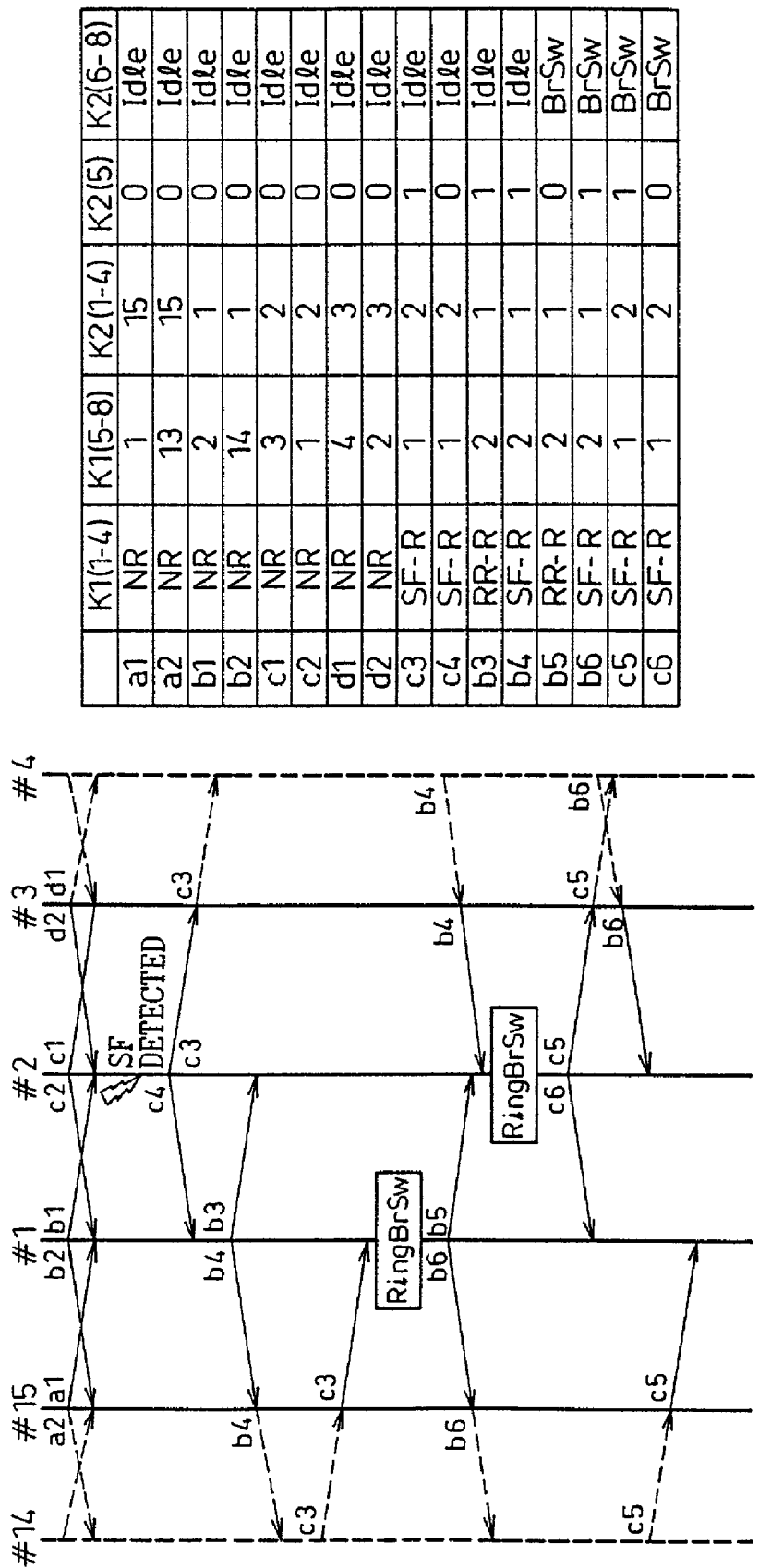
FIG. 24 is a diagram showing a sequence for transmission/reception of the K bytes in the event of the occurrence of a failure.

An example of the switching sequence of the third embodiment is shown in FIG. 24.

As described above, since more than 16 nodes on the same ring are uniquely identified according to the present invention, a bi-directional line switched ring (BLSR) comprising more than 16 nodes can be constructed without expanding the K1/K2 bytes and without making any changes to the switching control procedures as in the APS protocol.

The invention claimed is:

1. A method of transferring a message between a plurality of nodes forming a ring, comprising the steps of:
   generating a message containing
     a value specifying a short path and a long path, and
     an identifier identifying only a source node of said message when the path for said message is a short path and identifying only a destination node of said message when the path for said message is a long path; and
   transmitting said generated message.

2. A method according to claim 1, wherein said message consists of K1/K2 bytes, and said identifier is 8 bits long.

3. A method of transferring a message between a plurality of nodes forming a ring, wherein a first node identifier and a second node identifier are assigned to each node, and each node is uniquely identified by a combination of the first node identifier assigned to said node and two second node identifiers respectively assigned to two nodes adjacent on both sides thereof, said method comprising the steps of:
   generating a message containing one of the first and second node identifiers assigned to a destination node of said message, the other one of the first and second node identifiers assigned to a source node of said message, and a value specifying a short path or a long path; and
   transmitting said generated message.

4. A method according to claim 3, wherein said message consists of K1/K2 bytes.

5. An apparatus for transferring a message between a plurality of nodes forming a ring, comprising:
   means for generating a message containing
     a value specifying one of a short path and a long path and
     an identifier identifying only a source node of said message when the path for said message is a short path and identifying only a destination node of said message when the path for said message is a long path; and
   means for transmitting said generated message.

6. An apparatus according to claim 5, wherein said message consists of K1/K2 bytes, and said identifier is 8 bits long.

7. An apparatus for transferring a message between a plurality of nodes forming a ring, wherein a first node identifier and a second node identifier are assigned to each node, and each node is uniquely identified by a combination of the first node identifier assigned to said node and two second node identifiers respectively assigned to two nodes adjacent on both sides thereof, said apparatus comprising:
   means for generating a message containing one of the first and second node identifiers assigned to a destination node of said message, the other one of the first and second node identifiers assigned to a source node of said message, and a value specifying a short path or a long path; and
   means for transmitting said generated message.

8. An apparatus according to claim 7, wherein said message consists of K1/K2 bytes.

* * * * *